(12) United States Patent
Suzuki

(10) Patent No.: US 7,944,501 B2
(45) Date of Patent: May 17, 2011

(54) IMAGE SENSING APPARATUS AND IMAGE SENSING APPARATUS CONTROL METHOD

(75) Inventor: Shoichi Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 821 days.

(21) Appl. No.: 11/681,474

(22) Filed: Mar. 2, 2007

(65) Prior Publication Data

US 2007/0146529 A1    Jun. 28, 2007

Related U.S. Application Data

(63) Continuation-in-part of application No. 11/321,003, filed on Dec. 28, 2005.

(30) Foreign Application Priority Data

Dec. 28, 2004 (JP) .................................. 2004-381271
Aug. 23, 2005 (JP) .................................. 2005-241659
Mar. 3, 2006 (JP) .................................. 2006-058382

(51) Int. Cl.
 *H04N 5/222* (2006.01)
(52) U.S. Cl. ... 348/370; 348/371; 348/362; 348/333.01; 348/224.1; 348/229.1
(58) Field of Classification Search ............... 348/224.1, 348/371, 370
See application file for complete search history.

(56) References Cited

U.S. PATENT DOCUMENTS

| | | | | |
|---|---|---|---|---|
| 4,647,975 A | * | 3/1987 | Alston et al. ................ | 348/222.1 |
| 6,359,651 B1 | * | 3/2002 | Yokonuma .................... | 348/370 |
| 6,970,198 B1 | * | 11/2005 | Schinner et al. ......... | 348/333.01 |
| 7,209,170 B2 | | 4/2007 | Nishino et al. | |
| 7,433,589 B2 | * | 10/2008 | Odaka ............................ | 396/155 |
| 7,589,784 B2 | | 9/2009 | Chiba et al. | |
| 2002/0140845 A1 | * | 10/2002 | Yoshida et al. ............... | 348/371 |
| 2003/0122946 A1 | * | 7/2003 | Nishino et al. ................ | 348/297 |
| 2004/0189837 A1 | * | 9/2004 | Kido ............................. | 348/241 |
| 2005/0264688 A1 | | 12/2005 | Ouchi | |
| 2008/0165265 A1 | * | 7/2008 | Chiba et al. .................. | 348/308 |
| 2009/0213247 A1 | * | 8/2009 | Tanaka et al. ............ | 348/240.99 |

FOREIGN PATENT DOCUMENTS

| | | | |
|---|---|---|---|
| GB | 2332114 A | * | 6/1999 |
| JP | 62215250 A | * | 9/1987 |
| JP | 04134437 A | * | 5/1992 |
| JP | 2000-032332 A | | 1/2000 |
| JP | 2000-196951 | | 7/2000 |
| JP | 2001-069401 A | | 3/2001 |
| JP | 2004-069995 A | | 3/2004 |
| JP | 2004-147278 A | | 5/2004 |
| JP | 2005-347928 A | | 12/2005 |
| JP | 2006-005520 A | | 1/2006 |
| WO | WO 2005125185 A1 | * | 12/2005 |

\* cited by examiner

*Primary Examiner* — Jason Chan
*Assistant Examiner* — Cynthia Calderon
(74) *Attorney, Agent, or Firm* — Canon U.S.A., Inc., IP Division

(57) ABSTRACT

An image sensing apparatus has a plurality of pixels arranged in a matrix-like layout and containing photoelectric conversion devices reads signals in units of one line or a plurality of lines and is provide with an image sensing device 14 adapted to read a signal from a given block area. The apparatus has a flash read mode that, during flash operation, adjusts parameters relating to the readout of the image sensing device 14 so as to produce the same exposure period for all the plurality of lines that comprise a predetermined block area of the image sensing device 14, thus enabling accurate quantity of light detection even when performing strobe photography at high shutter speeds.

6 Claims, 24 Drawing Sheets

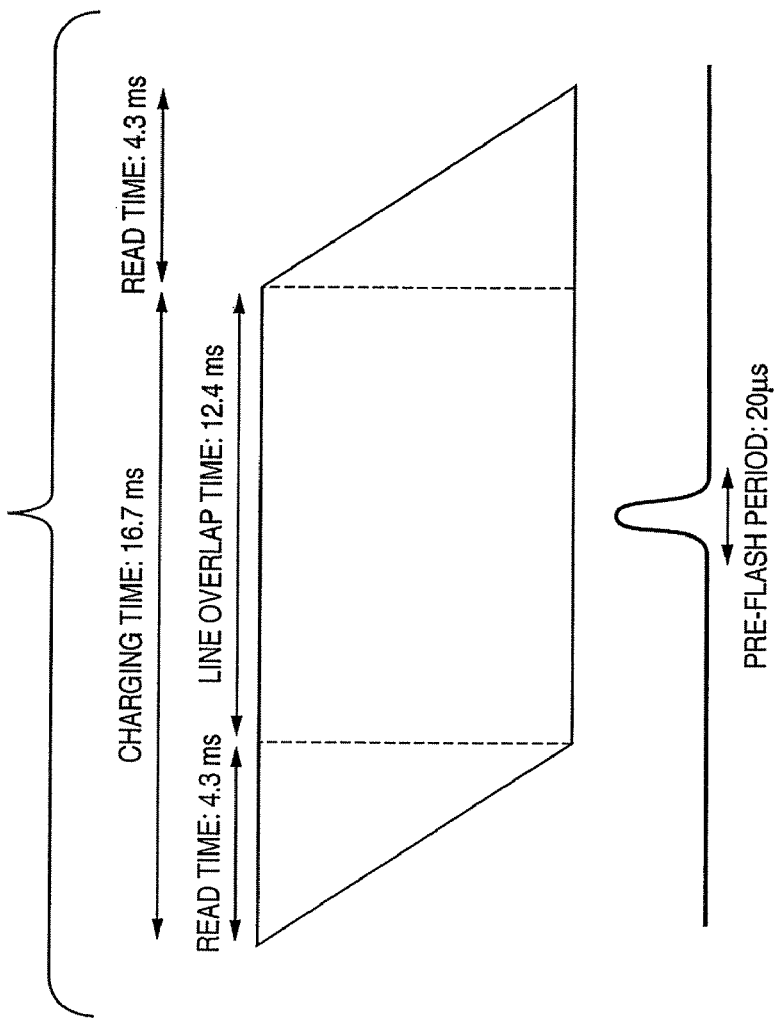

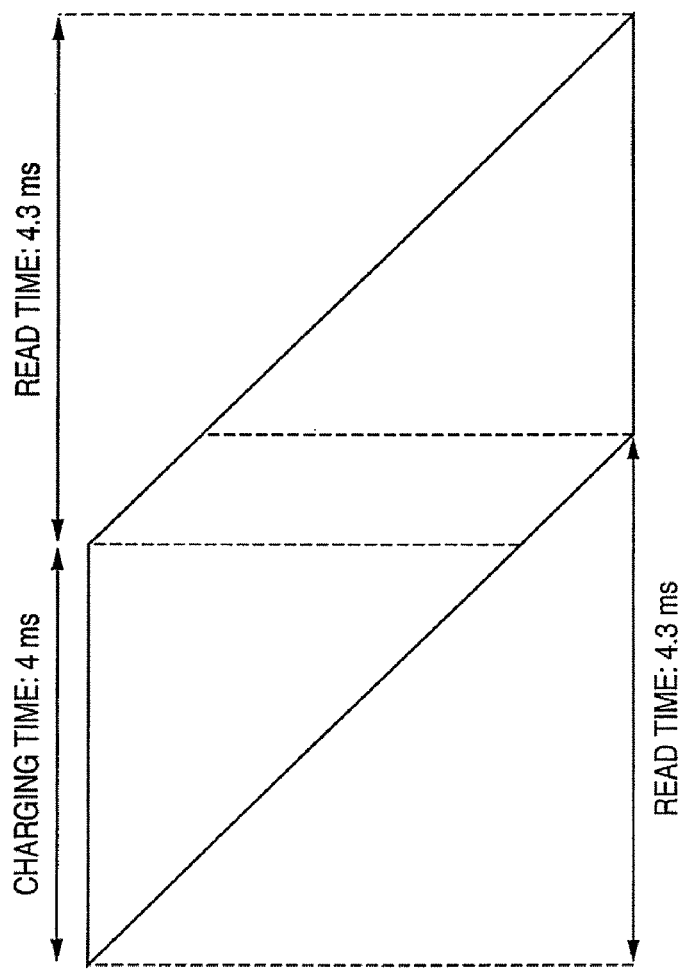

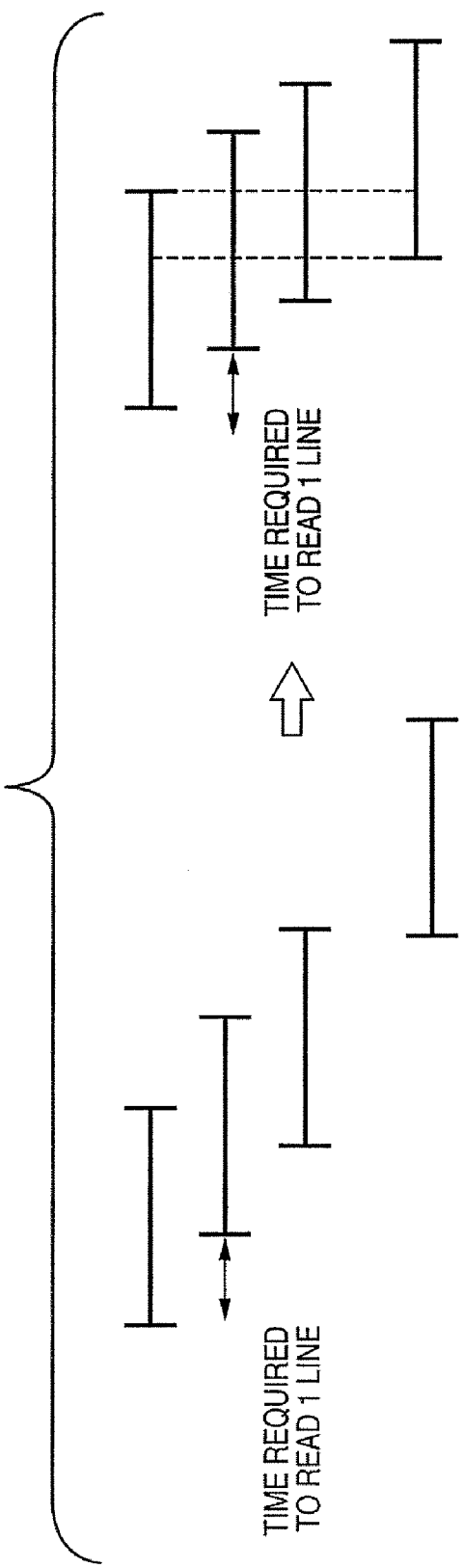

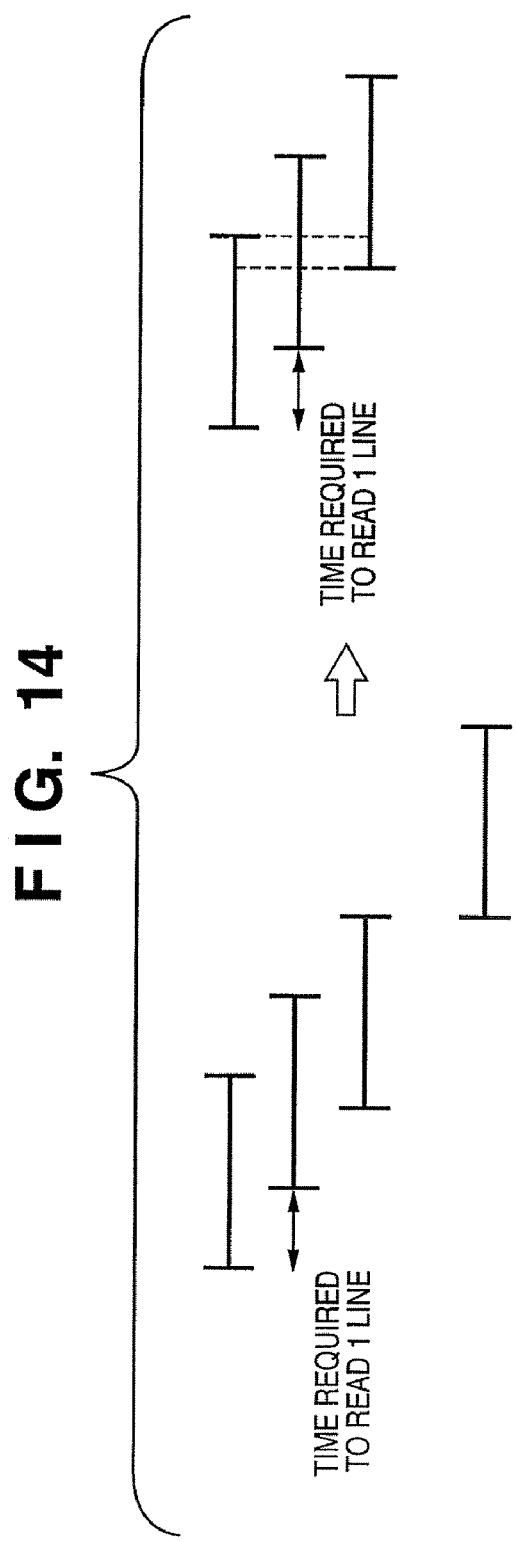

F I G. 19
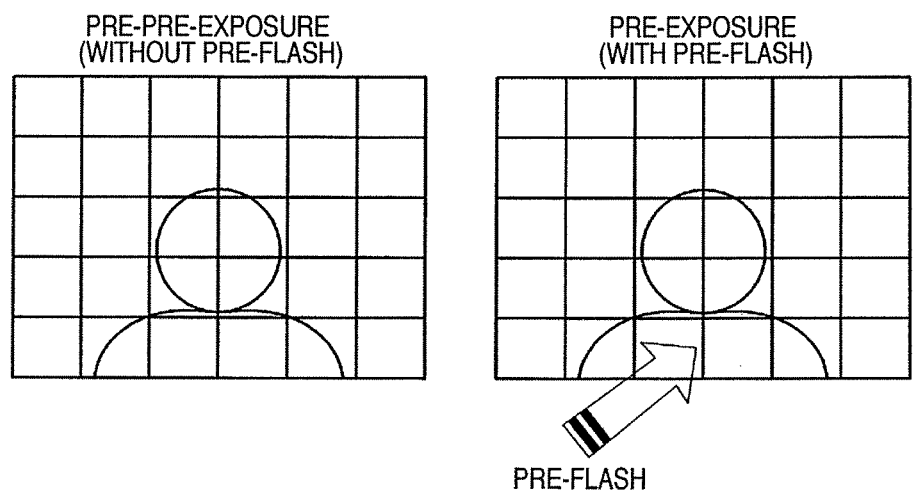

F I G. 20
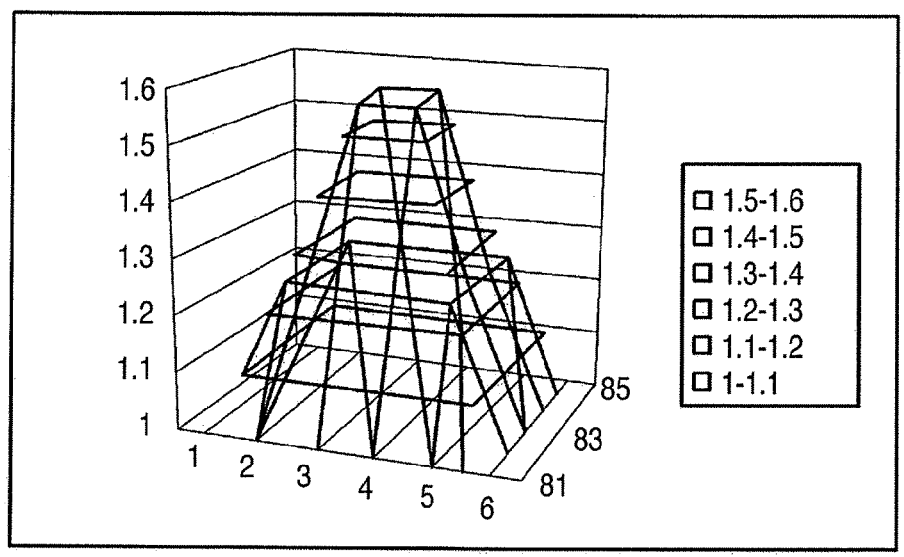

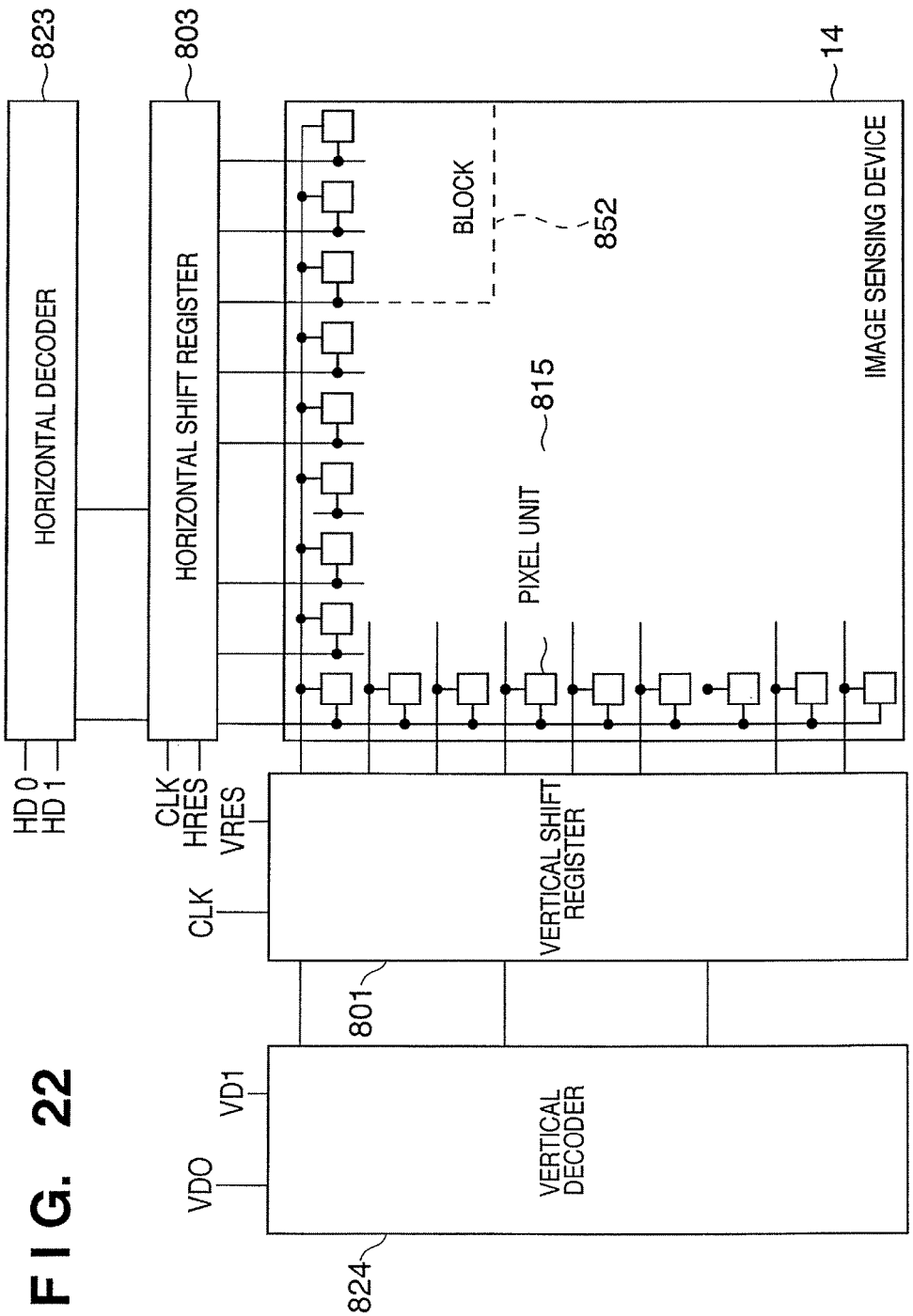

FULL ANGLE OF VIEW READ
(HORIZONTAL AND VERTICAL
THINNING OUT OF 1/2)

TWOFOLD ELECTRONIC ZOOM
(NO HORIZONTAL AND VERTICAL
THINNING OUT)

IMAGE SENSING APPARATUS AND IMAGE SENSING APPARATUS CONTROL METHOD

This is a continuation-in-part application of U.S. patent application Ser. No. 11/321,003 filed on Dec. 28, 2005, entitled "IMAGE SENSING APPARATUS AND IMAGE SENSING APPARATUS CONTROL METHOD".

BACKGROUND OF THE INVENTION

1. Field of the Invention

The present invention relates to an image sensing apparatus and an image sensing apparatus control method configured to carry out firing of a photometric pre-flash or the like, and more particularly, to an image sensing apparatus and an image sensing apparatus control method adapted to the use of an image sensing unit in which a plurality of photoelectric conversion devices like CMOS sensors is arrayed in a two-dimensional layout and that is capable of shifting an exposure period in units of one line or a plurality of lines.

2. Description of the Related Art

In recent years, image sensing units configured by integrating image sensing devices in high densities has been used in video cameras, digital cameras and the like, and it has become possible for a plurality of frames of image data to be recorded on a recording medium, and for image data to be printed out, displayed, and so forth.

An AE (Automatic Exposure) function is employed in these types of video cameras, digital cameras and the like, so as to expose during daylight at an optimum exposure condition obtained by measuring the light quantity of the imaging area.

In addition, such cameras are equipped with auxiliary lighting devices such as a flash or an electronic strobe and under low-light conditions, such as at night or indoors, flashlight is emitted when the image sensed (flash photography).

In reality, it is difficult to control the exposure instantaneously using the AE function when firing the flash. Therefore, a pre-flash firing is carried out, the quantity of light at that moment is measured, and automatic exposure control completed prior to the firing of the flash, after which the actual photography is carried out. Typically, since the quantity of light of the flash cannot be measured accurately if the pre-flash is fired outside the charging time of the image sensing unit. Thus the pre-flash firing is synchronized with the timing of the firing of the flash and the image sensing unit is charged.

In recent years, in video cameras, digital cameras and the like, in order to obtain high-resolution images, reduction in the size of the image sensing device cell using miniaturization processes is being energetically pursued.

At the same time, because the photoelectric conversion signal output per cell decreases as the cell size decreases, an amplifier-type image sensing unit in which the photoelectric conversion signal can be amplified has attracted attention. This type of amplifier-type image sensing unit includes such two-dimensional image sensing units as BASIS, MOS, SIT, AMI, CMD and other such XY address-type sensors.

In addition, as other two-dimensional image sensing units, CCD (Charge Coupled Device) sensors are widely used due to their characteristics: easy to integrate in high density and high S/N ratio.

In digital cameras and the like equipped with a two-dimensional image sensing unit, when an image is sensed, the device adjusts an exposure condition appropriately for that image in order to set the exposure period according to the sensitivity of the image sensing unit. When setting the exposure period, the device measures the quantity of light striking a portion of the image sensing devices arranged in a two-dimensional layout and changes such image sensing parameters as the aperture or the like until the measured value reaches a target value, thus finding the optimum values of the image sensing parameters. This operation is the AE (Automatic Exposure) operation.

When performing AE with a digital camera that uses a CCD sensor, all pixel data is read out and stored on a storage medium, from which predetermined block areas are extracted, and, after charging once, is compared to an appropriate, predetermined exposure level. Then, the image sensing parameters, such as the shutter speed, aperture, and so forth, are changed and the read-out pixel data is once again subjected to block area extraction and compared to a predetermined exposure level. By repeating this operation multiple times, the condition at which the block area exposure level becomes the predetermined exposure level is set as the optimum exposure condition.

A description is now given of an AE operation according to an image sensing unit that uses a CCD sensor, with reference to FIGS. 24A-24C. The sensor read method may be either interline transfer or full frame transfer. An image signal read out in time sequence from a CCD sensor 1601 is converted into a digital image signal by an A/D converter 1602 and a single frame is written to a frame memory 1603.

When performing AE using center-weighted metering, in particular only the central block area is read, and an integrator 1604 then integrates image signal levels in that block area to obtain a total integrated value for that block area. A determination circuit 1605 then compares the total integrated value of the block area and a preset, predetermined exposure level, and if the results of that comparison show that there is a difference between the two values, that difference is then output to an exposure condition setting circuit 1606. From among such exposure conditions as the exposure time/shutter speed the aperture value, and a charge time of the CCD sensor 1601, the exposure condition setting circuit 1606 changes the shutter speed or the like, for example. Under exposure conditions determined by the settings of the exposure condition setting circuit 1606, of the image data obtained once again from the CCD sensor 1601, the exposure integration value of the block area is detected, compared and determined by the determination circuit 1605, and the process repeated until the difference falls below a predetermined value, thereby obtaining the optimum exposure condition.

This AE operation is shown in the timing chart shown in FIG. 24B. In FIG. 24B, (1) shows the exposure time (electrical charge accumulation period) at low level period. At AE evaluation time (2), a period in which a block area is read from the frame memory 1603 and integrated after electrical charge accumulation and A/D conversion, is shown at high level. At the AE evaluation time AE values (3), the dotted line indicates the predetermined AE value, which, if graphed, would appear as shown in FIG. 24C, where, at a third exposure detection value, the AE value is too high, whereas the exposure conditions at a fourth AE value are made the AE conditions, thus enabling execution of optimum AE.

Nevertheless, in recent years, the number of instances in which CMOS sensors are used for the two-dimensional image sensing unit has been increasing because they are inexpensive and do not require complicated timing generation circuits, and moreover because they can operate a single power source and consume little electric power and the like.

However, because CMOS sensors read signals in units of lines, starting time of the photoelectric charge accumulation will be different for each line. As a result, accumulation timing for AE shifts for each line and accumulation period of a block area for AE evaluation and the pre-flash timing may get out of synch. In other words, of the lines contained in the block area for the purpose of AE evaluation, there appear lines that are not accumulated during the pre-flash.

As a countermeasure thereto, for example in Japanese Patent Application Laid-Open No. 2000-196951 there is disclosed controlling so as to fire the pre-flash for all block areas by using the pre-flash in periods in which the lines read from the block area overlap in time.

However, where the shutter speed is fast, such as during daylight synchro photography, there are no periods in which the lines read from the block area overlap in time. In such cases, when the pre-flash is fired arbitrarily, both the photoelectric charge from photographic light composed of outside or environment light and reflected light of the flash light and the photoelectric charge from photographic light composed only of outside light are to be accumulated at the CMOS sensor, making accurate detection of the quantity of light impossible as a result.

SUMMARY OF THE INVENTION

The present invention is conceived in light of the point described above, and has as its object to make it possible to implement accurate detection of the quantity of light even during high-speed shutter operation when using the flash.

To achieve the above-described object, the image sensing apparatus according to a first aspect of the present invention comprises an image sensing unit in which pixels containing photoelectric conversion devices are arranged in a plurality of lines, a drive unit configured to drive the image sensing unit so as to shift an exposure period in units of one line or a plurality of lines, and a control unit configured to be capable of switching a read mode which reads a signal from a predetermined area of the image sensing unit during flash to a flash read mode different from that during through-display that displays continuous images output sequentially from the image sensing unit on a display unit, wherein the flash read mode configured so that a portion of an exposure period of the first line read and the exposure period of a portion of the last line read in time overlap.

In addition, to achieve the above-described object, the image sensing apparatus according to another aspect of the present invention provides an image sensing unit in which pixels containing photoelectric conversion devices are arranged in a plurality of lines, a drive unit configured to drive the image sensing unit so as to shift an exposure period in units of one line or a plurality of lines, and a control unit configured so as to be capable of switching a read mode of a signal from a predetermined area of the image sensing unit during flash to a flash read mode different from that during through-display that displays continuous images output sequentially from the image sensing unit on a display unit, wherein the flash read mode configured so that a read period of a signal output from a predetermined area of the image sensing unit is shorter than that of the through-display read mode.

In addition, to achieve the above-described object, the image sensing apparatus according to another aspect of the present invention provides an image sensing apparatus comprising: an image sensing unit in which pixels containing photoelectric conversion devices are arranged in a plurality of lines; a drive unit configured to drive the image sensing unit so as to shift an exposure period in units of one line or a plurality of lines; a first control unit configured to be capable of switching a read mode for reading a signal from a predetermined area of the image sensing unit to a second read mode different from a first read mode that displays continuous images output sequentially from the image sensing unit on a display unit, wherein the second read mode configured so that a portion of an exposure period of the first line read and the exposure period of a portion of the last line read overlap in time; and a second control unit configured to determines flash amount using an output of the image sensing unit exposed without firing a pre-flash and an output of the image sensing unit exposed when firing a pre-flash in the second read mode.

In addition, to achieve the above-described object, the image sensing apparatus according to another aspect of the present invention provides an image sensing apparatus comprising: an image sensing unit in which pixels containing photoelectric conversion devices are arranged in a plurality of lines; a drive unit configured to drive the image sensing unit so as to shift an exposure period in units of one line or a plurality of lines; a first control unit configured to be capable of switching a read mode which reads a signal from a predetermined area of the image sensing unit to a second read mode different from a first read mode that displays continuous images output sequentially from the image sensing unit on a display unit, wherein the second read mode configured so that a read period of a signal output from a predetermined area of the image sensing unit is shorter than that of the first read mode; and a second control unit configured to determines flash amount using an output of the image sensing unit exposed without firing a pre-flash and an output of the image sensing unit exposed when firing a pre-flash in the second read mode.

In addition, to achieve the above-described object, the image sensing apparatus according to another aspect of the present invention provides an image sensing apparatus comprising: an image sensing unit in which pixels containing photoelectric conversion devices are arranged in a plurality of lines; a drive unit configured to drive the image sensing unit so as to shift an exposure period in units of one line or a plurality of lines; a first control unit configured to be capable of switching a read mode which reads a signal from a predetermined area of the image sensing unit to a second read mode different from a first read mode that displays continuous images output sequentially from the image sensing unit on a display unit, wherein the second read mode configured so that a portion of an exposure period of the first line read and the exposure period of a portion of the last line read overlap in time; and a second control unit configured to read a signal from a portion of the image sensing unit during an electronic zoom operation that electronically changes an angle of view in the second read mode.

In addition, to achieve the above-described object, the image sensing apparatus according to another aspect of the present invention provides an image sensing apparatus comprising: an image sensing unit in which pixels containing photoelectric conversion devices are arranged in a plurality of lines; a drive unit configured to drive the image sensing unit so as to shift an exposure period in units of one line or a plurality of lines; a first control unit configured to be capable of switching a read mode which reads a signal from a predetermined area of the image sensing unit to a second read mode different from a first read mode that displays continuous images output sequentially from the image sensing unit on a display unit, wherein the second read mode configured so that a read period of a signal output from a predetermined area of the image sensing unit is shorter than that of the first read mode; and a second control unit configured to read a signal from a portion of the image sensing unit during an electronic zoom operation that electronically changes an angle of view in the second read mode.

In addition, to achieve the above-described object, the present invention provides a control method for an image sensing apparatus having an image sensing unit in which pixels containing photoelectric conversion devices are arranged in a plurality of lines and a drive unit configured to drive the image sensing unit so as to shift an exposure period in units of one line or a plurality of lines, the control method comprising the step of switching a read mode which reads a signal from a predetermined area of the image sensing unit during flash to a flash read mode different from that during through-display that displays continuous images output sequentially from the image sensing unit on a display unit, wherein the lash read mode configured so that a portion of an exposure period of the first line read and the exposure period of a portion of the last line read in time overlap.

In addition, to achieve the above-described object, the present invention provides a control method for an image sensing apparatus having an image sensing unit in which pixels containing photoelectric conversion devices are arranged in a plurality of lines and a drive unit configured to drive the image sensing unit so as to shift an exposure period in units of one line or a plurality of lines, the control method comprising the step of switching a read mode which reads a signal from a predetermined area of the image sensing unit during flash to a flash read mode different from that during through-display that displays continuous images output sequentially from the image sensing unit on a display unit, wherein the flash read mode configured so that a read period of a signal output from a predetermined area of the image sensing unit is shorter than that of the through-display read mode.

Other objects and advantages besides those discussed above shall be apparent to those skilled in the art from the description of preferred embodiments of the invention which follows. In the description, reference is made to the accompanying drawings, which form a part thereof, and which illustrate an example of the various embodiments of the invention. Such examples, however, are not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a diagram showing the sequence of a processing operation when the flash is on;

FIG. 11 is a diagram showing the timing of the storage time for an EF evaluation block area in a case in which the shutter speed is 1/60;

FIG. 12 is a diagram showing is a diagram showing the timing of the storage time for an EF evaluation block area in a case in which the shutter speed is 1/250;

FIG. 13 is a diagram showing the timing of a storage time when the number of pixels to be read in the horizontal direction or the driving frequency of the horizontal blanking period is changed;

FIG. 14 is a diagram showing the timing of a storage time when the number of pixels to be read in the vertical direction is changed;

FIG. 17 is a diagram showing the sequence of a processing operation when the flash is on;

FIG. 19 is a diagram showing an image at pre-pre-exposure and an image at pre-exposure;

FIG. 20 is a view that illustrates center weighting;

FIG. 22 is a view for describing an operation that outputs a signal from a region of one portion of an image sensing device;

DESCRIPTION OF THE EMBODIMENTS

Preferred embodiments of the present invention will now be described in detail in accordance with the accompanying drawings.

First Embodiment

Figure 1:
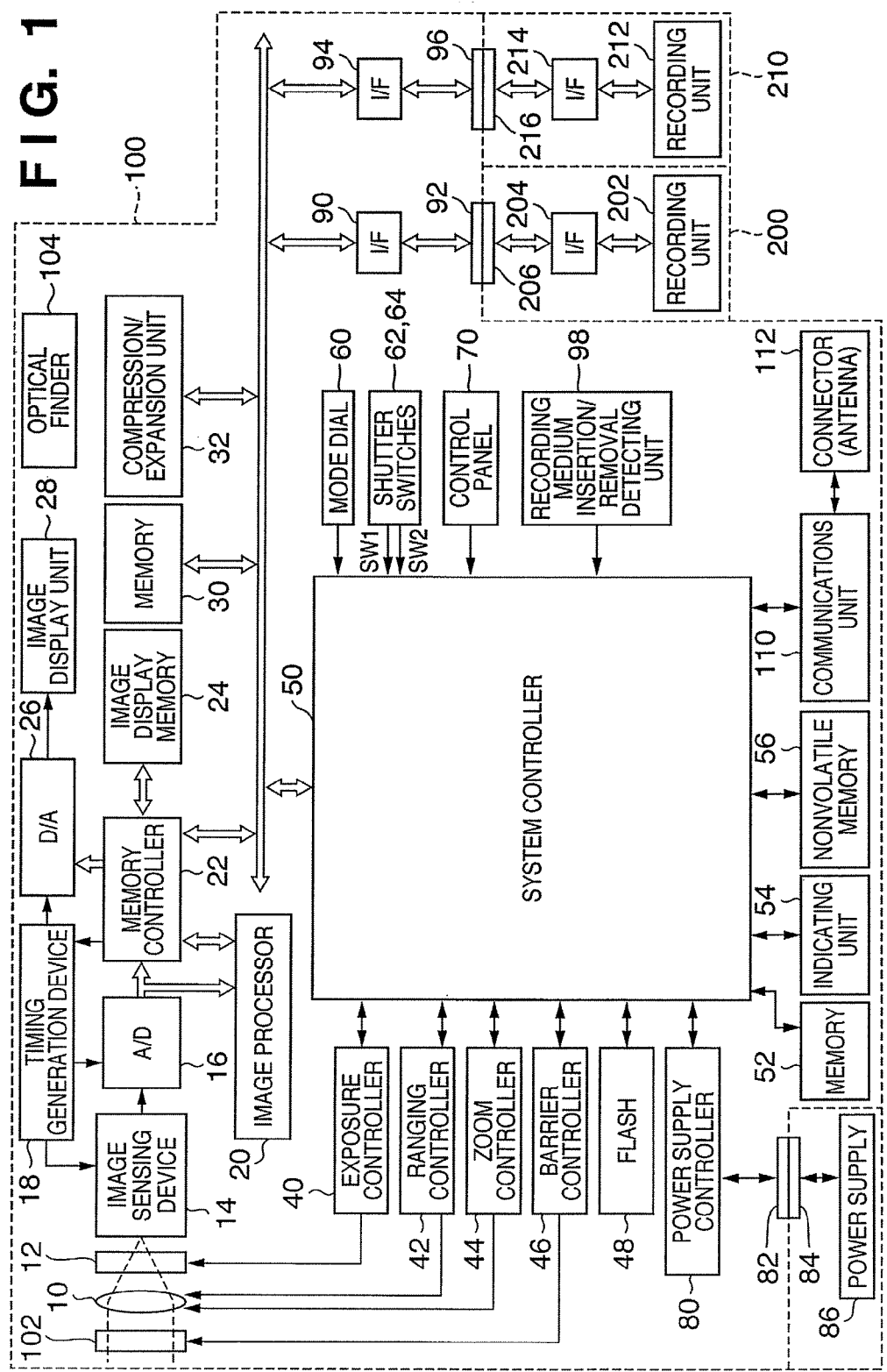
FIG. 1 is a diagram showing one configuration of an image sensing apparatus to which the present invention can be applied.

FIG. 1 is a diagram showing one configuration of an image sensing apparatus 100 such as a digital camera to which the present invention can be applied. In the diagram, reference numeral 10 designates a photographic lens and 12 designates a shutter equipped with an aperture function. Reference numeral 14 designates an image sensing device (image sensing unit). In the present embodiment, a CMOS sensor in which a plurality of pixels containing photoelectric conversion devices is arranged in a matrix-like layout whose signals are read out in units of line or a plurality of lines, and capable of reading signals of a given block area is used. Reference numeral 16 designates an A/D converter that converts analog signals output from the image sensing device 14 into digital signals.

Reference numeral 18 is a timing generator circuit that supplies clock signals and control signals to the image sensing device 14, the A/D converter 16 and a D/A converter 26, and is controlled by a memory controller 22 and a system controller 50.

Reference numeral 20 designates an image processor, which performs certain processes such as interpolation and color conversion on image data from the A/D converter 16 or image data from the memory controller 22. In addition, the image processor 20 performs certain calculations using image data output from the A/D converter 16, and based on the results of those calculations the system controller 50 performs TTL (through the lens) auto focus (AF), auto exposure (AE), and pre-flash (EF) on an exposure controller 40 and a ranging controller 42. Furthermore, the image processor 20 performs certain calculations using image data output from the A/D converter 16, and based on the results of those calculations performs TTL auto white balance (AWB).

Reference numeral 22 designates the memory controller, which controls the A/D converter 16, the timing generator circuit 18, the image processor 20, an image display memory 24, a D/A converter 26, a memory 30 and a compression/expansion unit 32. Image data output from the A/D converter 16 is written to the image display memory 24 or to the memory 30 either through the image processor 20 and the memory controller 22 or through the memory controller 22 alone.

Reference numeral 24 designates the image display memory, 26 designates the D/A converter and 28 designates an image display unit composed of a TFT LCD or the like. Image data for display that is written to the image display memory 24 is displayed on the image display unit 28 via the D/A converter 26.

If sensed image data is displayed in succession using the image display unit 28, an electronic view finder (EVF) function can be realized. It should be noted that the display on the image display unit 28 can be turned on and off by instructions issued from the system controller 50. If the image display unit 28 is turned off, consumption of electric power by the image sensing apparatus 100 can be greatly reduced. In addition, the image display unit 28 displays information pertaining to such things as focus, hand-shake, flash charge, shutter speed, aperture value, exposure correction, and so forth, in accordance with instructions from the system controller 50.

Reference numeral 30 is a memory for storing sensed still images and sensed moving images, and is provided with enough storage capacity to store a predetermined number of frames of still pictures or a predetermined length of time of moving images. As a result, large volumes of images can be written to the memory 30 at high speed in sequential photography or in panorama photography, involving multiple still image frames shot continuously. In addition, the memory 30 can also be used as a work area for the system controller 50.

Reference numeral 32 designates the compression/expansion unit, which compresses and expands image data using an Adaptive Discrete Cosine Transform (ADCT) or the like. The compression/expansion unit 32 has the capability to compress image data read out from the memory 30 and write the compressed image data to the memory 30, as well as the capability to expand image data read from the memory 30 and to write the expand image data to the memory 30.

Reference numeral 40 designates the exposure controller that controls the shutter 12 equipped with an aperture function, and also has the capability to adjust the flash by linkage with a flash 48. Reference numeral 42 designates the ranging controller that controls the focusing of the photographic lens 10, 44 designates a zoom controller that controls the zooming of the photographic lens 10, and 46 designates a barrier controller that controls the operation of a barrier 102 that protects the lens 10. Reference numeral 48 designates the flash, which has an AF auxiliary lighting projective function and a flash adjustment function. The exposure controller 40 and the ranging controller 42 are controlled using the TTL method, and as described above, based on the results of calculations performed on image data from the A/D converter 16 by the image processor 20, the system controller 50 controls the exposure controller 40 and the ranging controller 42.

Reference numeral 50 is the system controller that controls the entire image sensing apparatus 100, and reference numeral 52 designates a memory for storing constants, variables, programs and the like for the operation of the system controller 50.

Reference numeral 54 designates an indicating unit comprised of a LCD device, speaker or the like and indicates the operating status and supplies messages using text, image, voice or other data in response to the execution of a program by the system controller 50. The indicating unit is positioned at one location or at a plurality of easily viewable locations near a control panel for the image sensing apparatus 100. In addition, a portion of the functions of the indicating unit 54 are located inside the optical viewfinder 104.

Of the displays of the display unit 54, those that are displayed on the LCD or the like include a single shot/continuous shot, self-timer, compression rate, number of recorded pixels, number of shots recorded, number of exposures remaining, red-eye reduction, macro-photography, buzzer setting, remaining battery power for clock, remaining battery power, error, multi-digit information, insertion/removal status of recording media 200 and 210, communications IF operation, and date/time.

In addition, of the displays of the display unit 54, those that are displayed in the optical viewfinder 104 include focus, hand-shake warning, flash charged, shutter speed, aperture value, exposure correction and the like.

Reference numeral 56 designates an electrically erasable/programmable nonvolatile memory, for which an EEPROM, for example, is used.

Reference numerals 60, 62, 64 and 70 designate operating means for inputting all types of operating instructions of the system controller 50, and are comprised of combinations of single or multiple switches and dials, touch panels, visual detection pointing devices, voice recognition devices and the like.

Reference numeral 60 designates a mode dial switch, which switches among and sets such functional modes as power off, automatic shooting mode, shooting mode, panorama shooting mode, playback mode, multi-screen playback/erasure mode, PC connection mode, and so forth.

Reference numeral 62 designates a shutter switch SW1, which is switched ON by pressing a shutter button, not shown, halfway, and orders the start of such operations as the AF process, the AE process, the AWB process, the EF process, and so forth.

Reference numeral 64 designates a shutter switch SW2, and switches on when the shutter button, not shown, is pressed all the way. When SW2 is switched ON, the start of operations of the following series of process is ordered:

an exposure process that writes signals read out from the image sensing device 14 to the memory 30 as image data through the A/D converter 16 and the memory controller 22, a development process using calculations performed by the image processor 20 and the memory controller 22, a compression encoding process that reads out image data from the memory 30 and performs image compression at the compression/expansion unit 32, a recording process that writes image data to the recording media 200 or 210.

Reference numeral 70 designates a control panel comprised of a variety of buttons and switch panels or the like, and includes, for example, the following keys, buttons and so forth: Menu button, set button, macro/non-macro switching button, multi-screen playback page button, flash set button, single shot/continuous shot/self timer switching button, menu navigation + (plus) button, menu navigation − (minus) button, played back image navigation + (plus) button, played back image − (minus) button, photograph quality selection button, exposure correction button, date/time set button.

Reference numeral 80 designates a power supply controller, and is composed of switching circuits and the like for switching a battery detection circuit, a DC-DC converter, and those block areas that are to be provided with power. The power supply controller 80 also detects whether or not the battery has been installed, the type of battery, and the remaining battery power, controls the DC-DC converter based on the results of those detection operations and on instructions of the system controller 50, and supplies the necessary electrical voltage for the required time to all parts, including the recording media.

Reference numerals 82, 84 designate connectors, and 86 designates a power supply composed of a primary battery, such as an alkaline battery or a lithium battery, a secondary battery, such as a NiCd battery, a NiMH battery or a Li battery, or an AC adapter or the like.

Reference numerals 90 and 94 designate interfaces for a recording medium such as a memory card, a hard disk or the like, 92 and 96 designate connectors that perform a connection to the memory card, hard disk or other recording media, and 98 designates a recording medium insertion/removal detecting unit that detects whether or not the recording media 200, 210 are inserted into the connectors 92, 96.

Reference numeral 102 designates the barrier, which protects the image sensing part of the image sensing apparatus 100 from dirt and dust by covering the image sensing part that includes the lens 10.

Reference numeral 104 designates the optical viewfinder, which enables photography using only the optical viewfinder 104, without using the electronic viewfinder function provided by the image display unit 28. In addition, a portion of the functions of the display unit 54 are placed inside the optical viewfinder 104, for example, focus, hand-shake warning, flash charged, shutter speed, exposure correction and the like.

Reference numeral 110 designates a communications unit, and has a variety of communications functions such as RS232C, USB, IEEE 1394, P1284, SCSI, modem, LAN, wireless and the like. Reference numeral 112 designates a connector, or an antenna in the case of wireless communications, that connects the image sensing apparatus 100 to other instruments through the communications unit 110.

Reference numerals 200 and 210 designate the recording media such as a memory card, a hard disk or the like. The recording media 200 and 210 are provided with recording parts 202 and 212, composed of semiconductor memories, magnetic disks or the like, interfaces 204 and 214 for the image sensing apparatus 100, and connectors 206 and 216 that provide connections to the image sensing apparatus 100.

Figure 2:
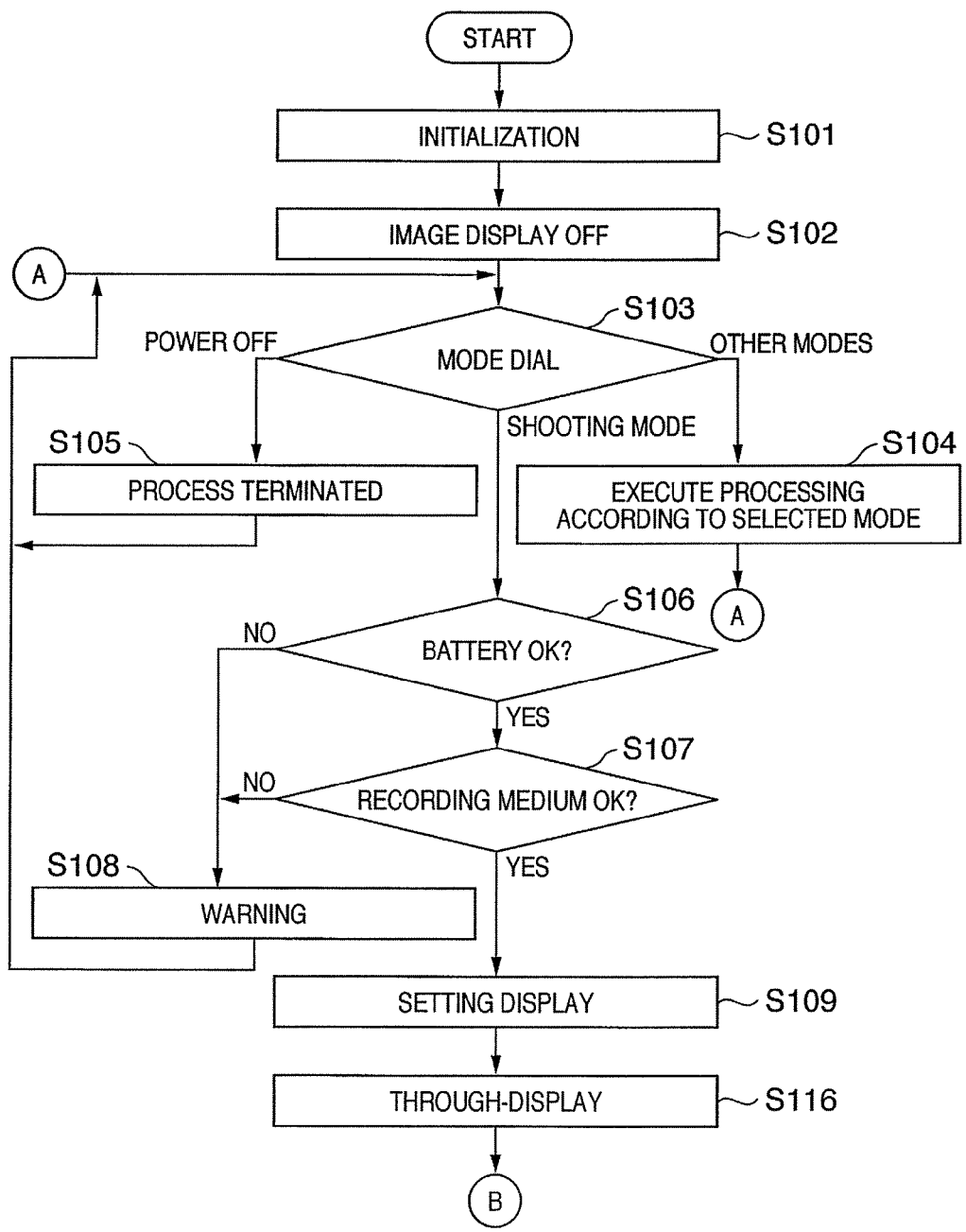
FIG. 2 is a flow chart illustrating a portion of the main routine of a processing operation at an image sensing apparatus according to a first embodiment of the present invention.
Figure 3:
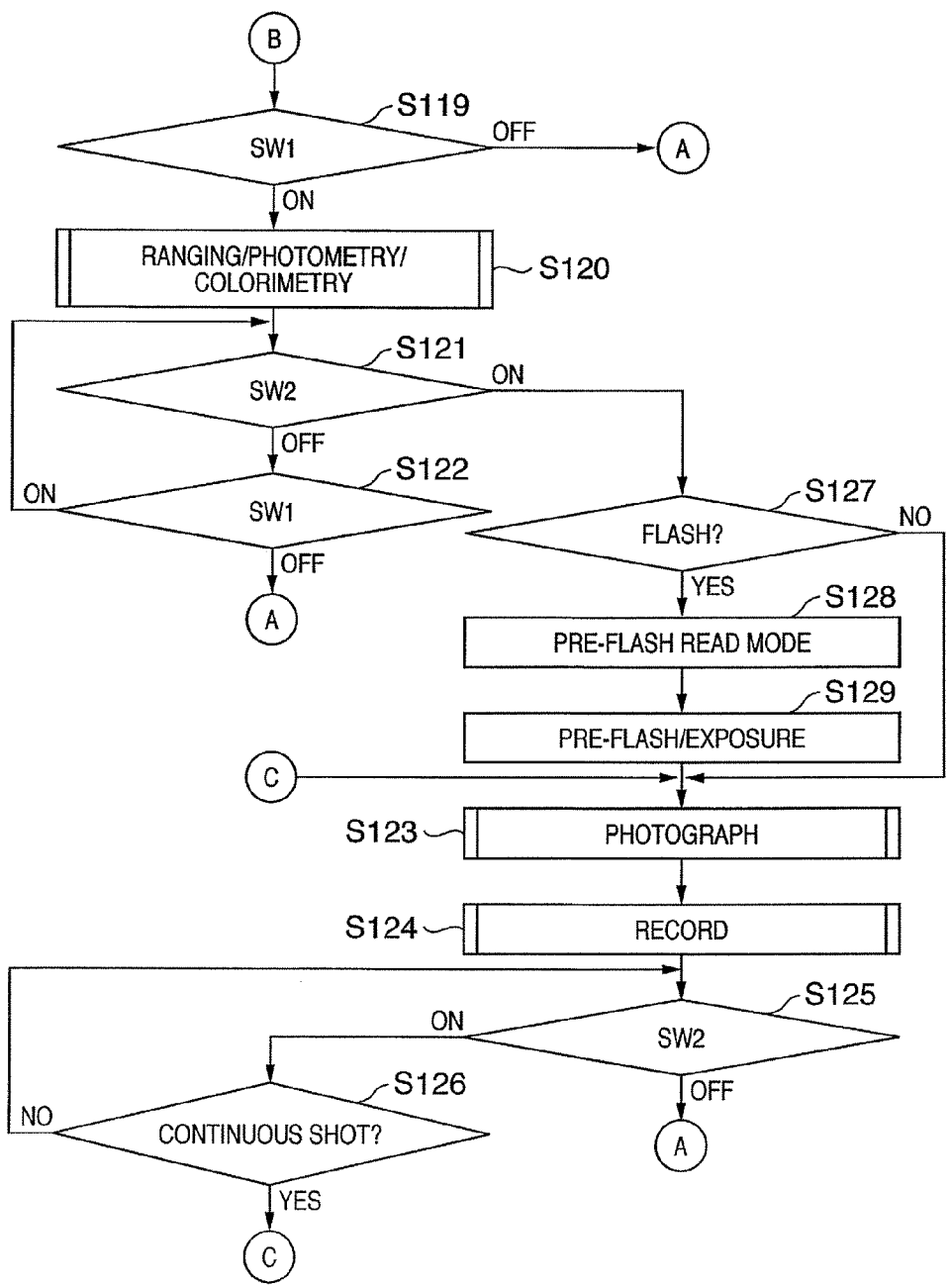
FIG. 3 is a flow chart illustrating a portion of the main routine of a processing operation at an image sensing apparatus according to the first embodiment.

FIGS. 2 and 3 are flow charts illustrating the main routines of the processing operations performed by the image sensing apparatus 100. Exchanging the battery or otherwise activating the power supply causes the system controller 50 to initialize flags, control variables and the like (step S101), and sets the image display of the image display unit 28 to OFF (step S102).

The system controller 50 determines the setting for the mode dial switch 60. If the mode dial switch 60 is set to power OFF (step S103), then a predetermined termination process is performed (step S105). Termination includes, for example, the following processes:

Change displays of all display units to termination state
Close barrier 102 to protect image sensing part
Record parameters, including flags, control variables, and so forth, and settings, in nonvolatile memory
Cause the power supply controller 80 to cut off unneeded supplies of power to all parts of the image sensing apparatus 100, including the image display unit 28

When termination is completed, processing returns to step S103.

By contrast, if the mode dial switch 60 is set to the shooting mode (step S103), then processing proceeds to step S106. If the mode dial switch 60 is set to some other mode (step S103), the system controller 50 executes processes in accordance with the selected mode (step S104). When finished, processing returns to step S103.

In the shooting mode, the system controller 50 determines whether or not the remaining battery power and the operation of the power supply 86 composed of a battery or the like by the power supply controller 80 pose a problem for the operation of the image sensing apparatus 100 (step S106). If there is a problem, processing returns to step S103 after the system controller 50 performs a predetermined warning display by image or by voice using the indicating unit 54 (step S108).

If there is no problem with the power supply 86, the system controller 50 determines whether or not the operating state of the recording media 200 and 201 poses a problem for the operation of the image sensing apparatus 100, in particular the recording of image data to and the playback of image data from the recording media 200 and 201 (step S107). If there is a problem, then processing returns to step S103 after the system controller 50 performs a predetermined warning display by image or by voice using the indicating unit 54 (step S108).

If there is no problem with the operating status of the recording media 200 and 201 (S107), the system controller 50 notifies a user of the settings of the image sensing apparatus 100 by image or by voice using the indicating unit 54 (step S109). It should be noted that if the image display of the image display unit 28 is ON, then the user may be notified of the settings of the image sensing apparatus 100 by image or by voice using the image display unit 28.

Next, the system controller 50 (step S116) sets the display of sensed image data to through-display, in which the sensed image data is displayed in succession. Through-display is a state that allows the image display unit 28 to act as an electronic viewfinder. Specifically, through the image sensing device 14, the A/D converter 16, the image processor 20 and the memory controller 22, the system controller 50 displays data written in succession to the image display memory 24 on the image display unit 28 via the memory controller 22 and the D/A converter 26.

Next, the state of a shutter switch SW1 is checked. If the shutter switch SW1 is OFF (step S119), processing returns to step S103. If the shutter switch SW1 is ON (step S119), then the system controller 50 performs ranging to focus the photographic lens 10 on the subject, and performs photometry to set the aperture value and the shutter speed. If necessary, a flash flag is set and the setting of the flash is performed as well in the photometry process (S120). Details of the ranging/photometry/colorimetry process are described later using FIG. 4.

Once ranging/photometry/colorimetry (step S120) is completed, the state of the shutter switch SW2 is checked. If the shutter switch SW2 has not been pressed (step S121), and moreover, if the shutter switch SW1 has been released (step S122), processing returns to step S103. Processing returns to step S121 if the shutter switch SW1 has been left ON (step S122) without the shutter switch SW2 being pressed (S121).

If the shutter switch SW2 has been pressed (step S121), then the system controller 50 determines whether or not the flash is required depending on the presence or absence of the flash flag set in the ranging/photometry/colorimetry (step S120) as described later (step S127). If the flash is required, the system controller 50 switches the method of reading out the signals from the image sensing device 14 from the EVF read mode used up to this point to a pre-flash read mode, and performs pre-flash/exposure (step S129). If the flash is not required, then processing proceeds to step S123. Details of the pre-flash read mode are described later.

Next, the system controller 50, through the image sensing device 14, the A/D converter 16, the image processor 20, and the memory controller 22, or directly through the memory controller 22 from the A/D converter 16, performs an exposure process of writing the photographed image data to the memory 30. In addition, using the memory controller 22 and, if necessary, the image processor, the system controller 50 executes a photographic process composed of a development process that reads the image data written to the memory 30 and performs a variety of processes (step S123). Details of the photographic process are described later using FIG. 5.

After the end of the photographic process, the system controller 50 reads out the sensed image data written to the memory 30 and performs a variety of image processes on the data using the memory controller 22 and, if necessary, the image processor 20. In addition, after performing image compression in accordance with the mode set using the compression/expansion unit 32, executes a recording process that writes image data to the recording media 200 or 210 (step S124). Details of the recording process are described later using FIG. 6.

After the end of the recording process, the state of the shutter switch SW2 is investigated (step S125). If the shutter switch SW2 is OFF, processing returns to step S103. If the shutter switch SW2 is ON, it is confirmed whether or not the apparatus is set to continuous shot (step S126). If continuous shot is not set, processing returns to step S124, release of the shutter switch SW2 is awaited, and processing returns to step S103. If continuous shot is set, processing returns to step S123 and the next photography performed.

Figure 4:
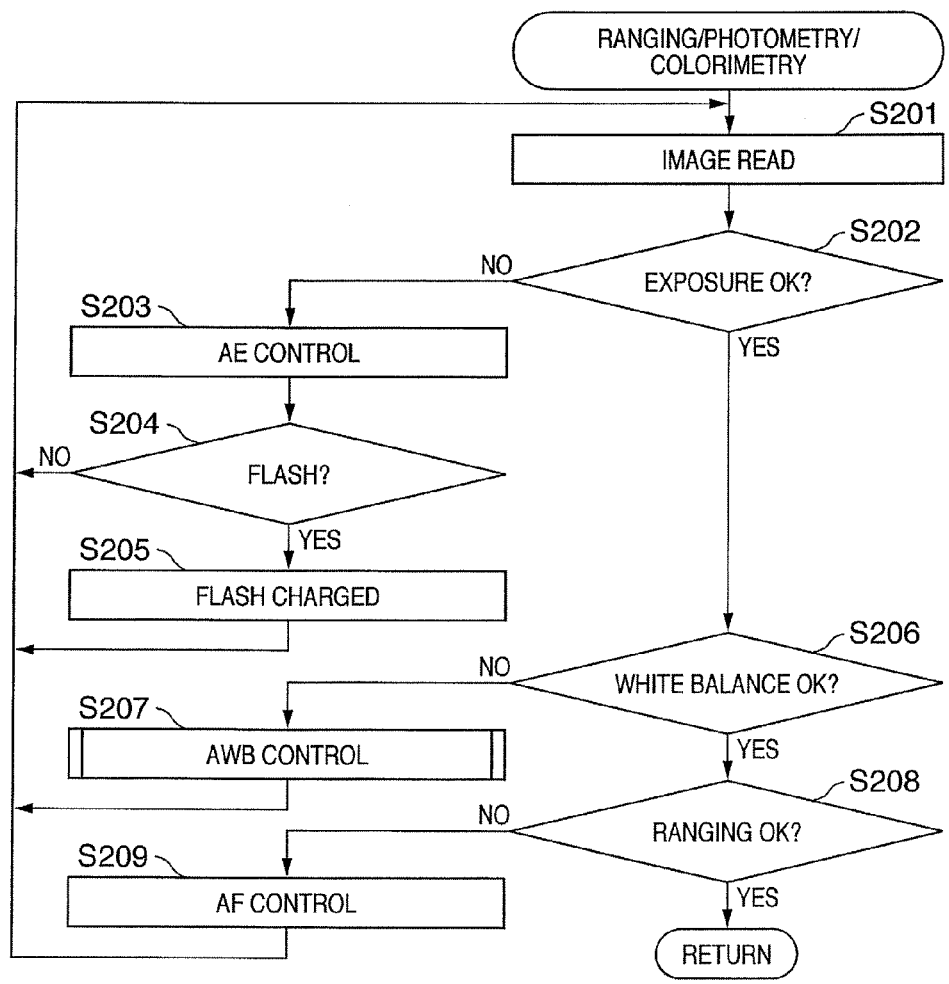
FIG. 4 is a flow chart illustrating a ranging/photometric/colorimetry process.

FIG. 4 is a detailed flow chart of the ranging/photometry/colorimetry process in step S120 shown in FIG. 3. The system controller 50 reads out electrical charges from the image sensing device 14 and reads the image data in succession to the image processor 20 through the A/D converter 16 (step S201). Using the successively read-in image data, the image processor 20 performs predetermined calculations used in the TTL AE process, the EF process and the AF process. It should be noted that these processes extract as necessary the required number of particular portions from among all the photographed pixels for use in the calculations. As a result, in the TTL-type AE, EF, AWB and AWB processes, it becomes possible to perform the optimum calculation for each of several different modes such as center-weighted mode, average mode, evaluation mode, and so forth.

Until exposure (AE) is deemed to be correct using the calculation results obtained by the image processor 20 (step S202), the system controller 50 continues to perform AE control using the exposure controller 40 (step S203). Using measurement data obtained by the AE control, the system controller 50 determines whether or not the flash is required (step S204), and if so, sets the flash flag and charges the flash 48 (step S205). If the flash is not required, processing returns as is to step S201.

If the exposure (AE) is deemed to be correct (step S202), the measurement data and/or the setting parameters are stored in the system controller 50 internal memory or in the memory 52.

Next, using the measurement data obtained by the AE control and the results of the calculations performed by the image processor 20, the system controller 50 performs the auto white balance (AWB) control process. In other words, until the white balance is deemed to be correct (step S206), the system controller 50 continues to adjust the color processing parameters using the image processor 20 (S207). When the white balance is deemed correct (step S206), the measurement data and/or setting parameters are stored in the system controller 50 internal memory or in the memory 52.

Until the ranging (AF) is deemed to be in focus using the measurement data obtained by AE control and AWB control (step S208), the system controller 50 continues to perform AF control using the ranging controller 42 (step S209). Once the ranging (AF) is deemed to be in focus (step S208), the measurement data and/or the setting parameters are stored in system controller 50 internal memory or in the memory 52 and the ranging/photometry/colorimetry routine is terminated.

Figure 5:
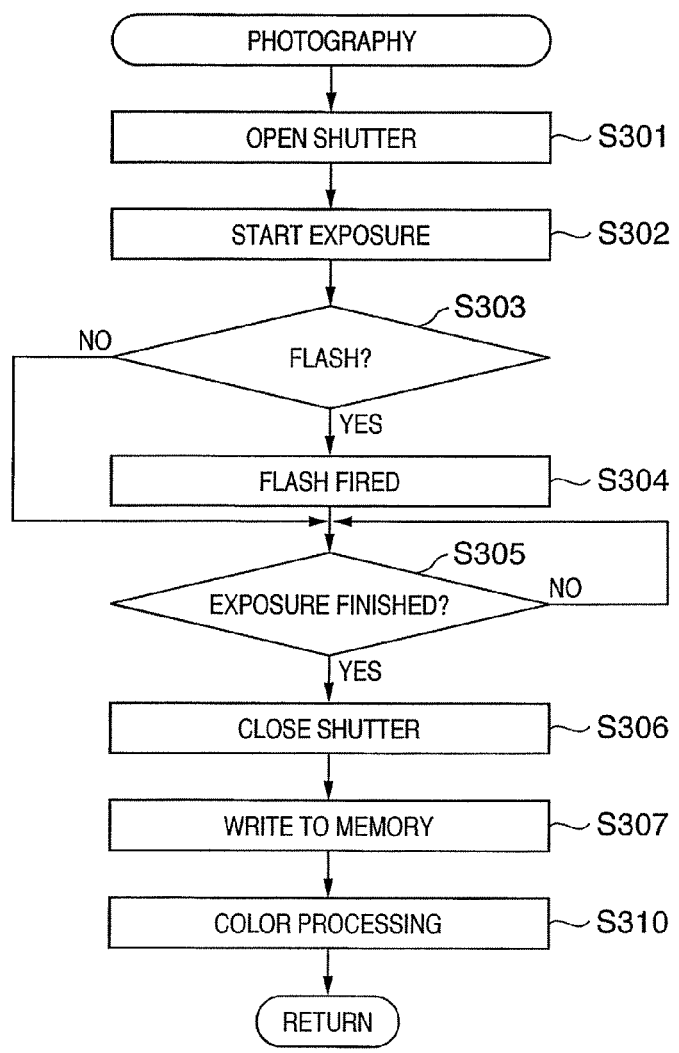
FIG. 5 is a flow chart illustrating a photographic process.

FIG. 5 is a detailed flow chart of the photographic process in step S123 shown in FIG. 3.

The system controller 50, as described with reference to FIG. 4, in accordance with the photometric data stored in the system controller 50 internal memory or in the memory 52, controls the exposure controller 40 and releases the shutter 12 having the aperture function according to the aperture value (step S301), and then starts exposure of the image sensing device 14 (step S302).

Next, depending on the flash flag it is determined whether or not the flash is required (step S308). If the flash is necessary, the flash is fired (step S304). If the flash is not required, then processing proceeds to step S306 without firing the flash.

The system controller 50, in accordance with the photometric data, awaits the completion of the exposure of the image sensing device 14 (step S305). When the exposure period ends, the system controller 50 closes the shutter 12 (step S306) and reads electrical charge signals from the image sensing device 14. Then, through the A/D converter 16, the image processor 20 and the memory 22, or directly through the memory controller 22 from the A/D converter 16, the system controller 50 writes the image data to the memory 30 (step S307).

Next, according to the set photographic mode, after sequential execution of color processing (step S310), the processed image data is written to the memory 30 and the photographic process routine is terminated.

Figure 6:
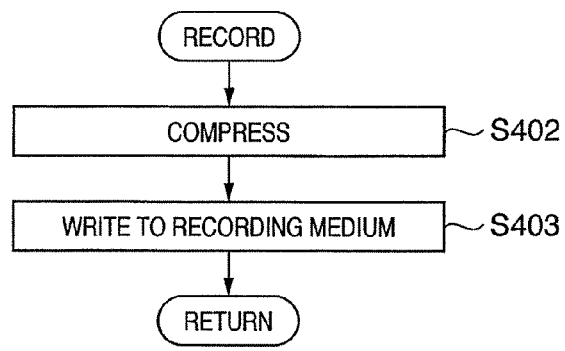
FIG. 6 is a flow chart illustrating a recording process.

FIG. 6 is a detailed flow chart illustrating the recording process in step S124 shown in FIG. 3. Using the memory controller 22 and, if necessary, the image processor 20, the system controller 50, reads out the image data written to the memory 30 and performs image compression processing according to the set mode using the compression/expansion unit 32 (step S402). Then, through either interface 90 or 94 and through connector 92 or 96, the system controller 50 writes the compressed image data to the recording media 200 or 201 such as a memory card, a CF (compact flash (registered trademark)) card or the like.

Figure 7:
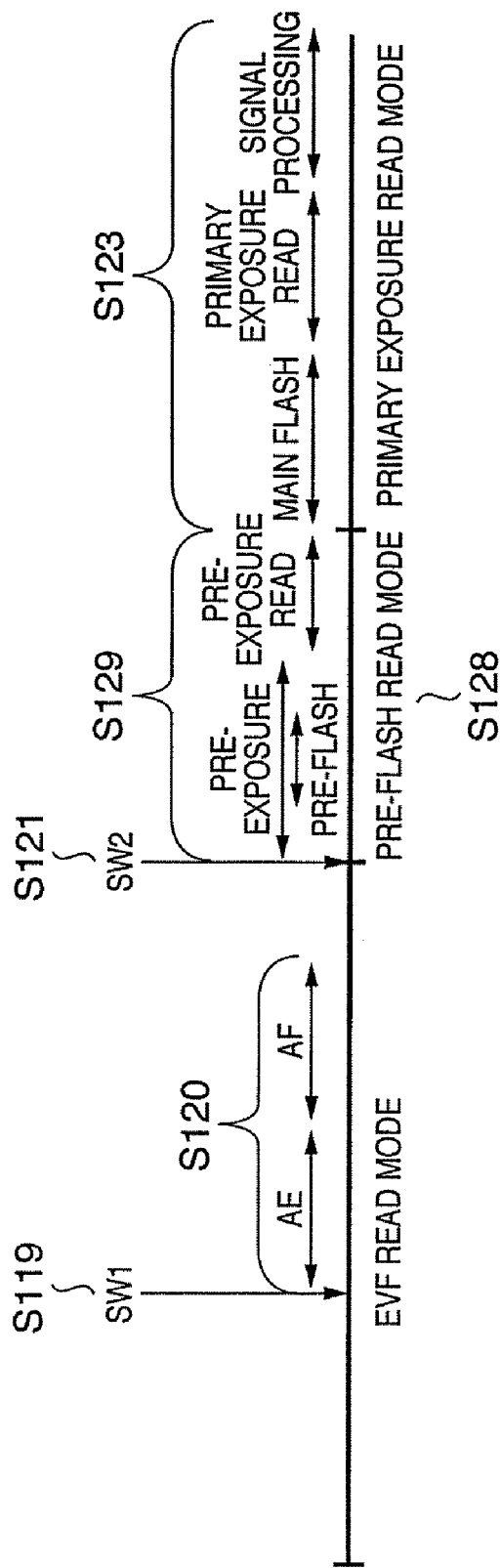

In the above-described image sensing apparatus, when the flash is required, as is shown also in FIG. 7, if the shutter switch SW1 is ON (step S119), the ranging/photometry/colorimetry process is performed (step S120). Thereafter, if the shutter switch SW2 is switched to ON (step S121), the method used to read the signals from the image sensing device 14 is switched from the EVF read mode to the pre-flash read mode (step S128). Then, as a pre-flash/exposure process, pre-flash as well as pre-exposure and signal read-out are performed (step S129). In other words, during pre-flash, a shift is made to a pre-flash read mode that is different from both the EVF read mode and the primary exposure read mode. With the pre-flash/exposure process performed immediately after the shutter switch SW2 is switched ON, the time between the start of primary exposure and the start of pre-exposure is shortened, thus making it possible to achieve high-accuracy strobe light adjustment.

In this case, when the shutter switch SW2 is switched ON, updating of the display of the image display unit 28 (the EVF output) is halted and through-display of the signals read out in the pre-flash read mode is not performed.

Figure 8:
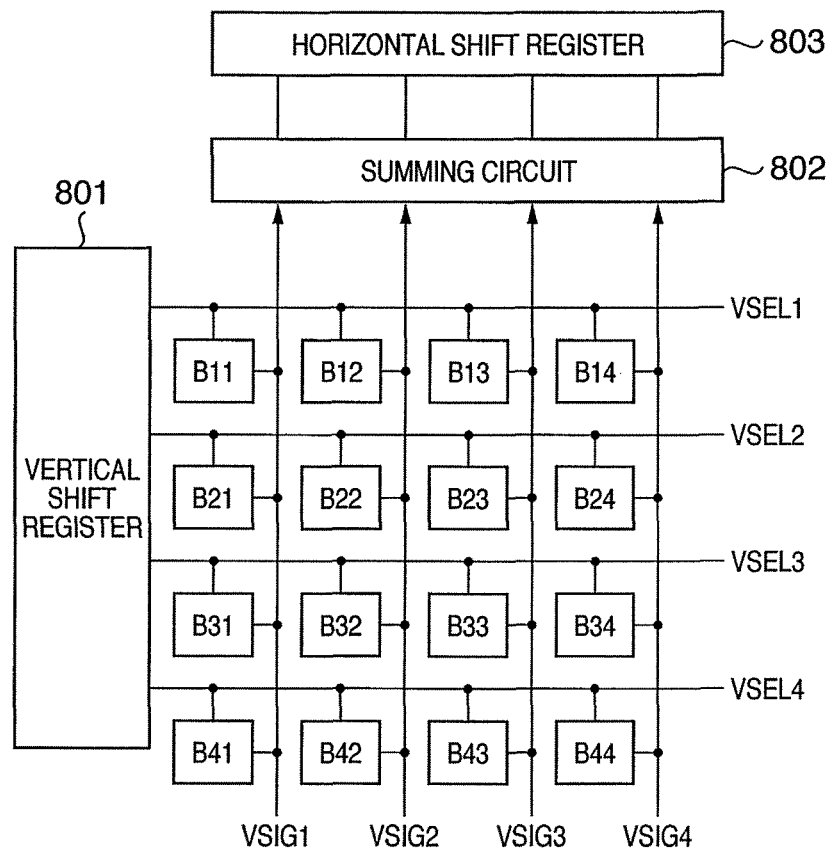
FIG. 8 is a CMOS sensor circuit diagram.

FIG. 8 is a circuit diagram of a CMOS sensor used as the image sensing device 14.

In the diagram, B11-B44 are pixels comprised of a photoelectric conversion device such as a photodiode or the like, an amplifier-type MOS transistor that reads out the accumulated electrical charge in the photoelectric conversion device, a selecting MOS transistor that activate the amplifier-type MOS transistor. The pixels are arranged in a matrix-like layout (in the example shown in the diagram, a 4×4 pixel layout).

In the EVF read mode, a summing average is performed on, for example, two horizontal pixels and two vertical pixels. In other words, VSEL1, which reads out each horizontal line, is output from the vertical shift register 801, and the photo output of each of the pixels selected by the VSEL1 control pulse is read out to the vertical output lines VSIG1-4 and accumulated in the summing circuit 802.

Figure 9:
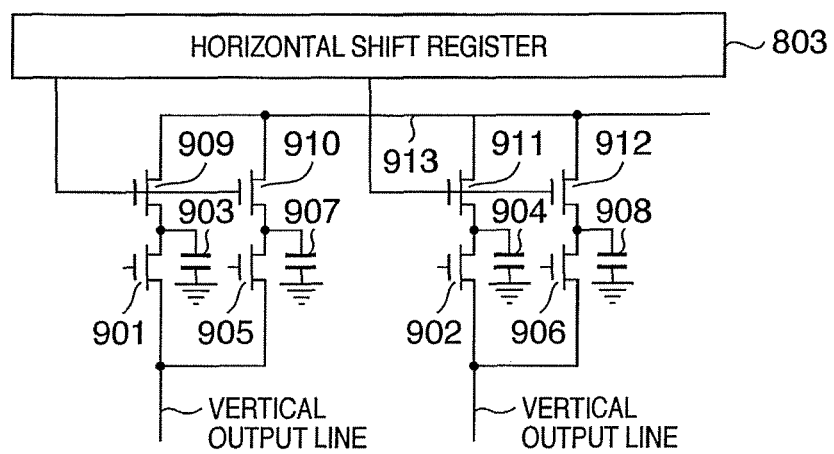
FIG. 9 is a diagram showing one circuit configuration of a summing circuit.

FIG. 9 is a diagram showing the circuit structure of the summing circuit 802, showing a situation in which the photo output of the two horizontal pixels B11, B12 and the two vertical pixels B21, B22 are added. As shown in the diagram, the signal components of pixels B11, B12 are accumulated in capacitors 903, 904 through transfer switches 901, 902 from the vertical output lines connected to each pixel. At the next cycle, the VSEL2 shown in FIG. 8 is output and the signal components of pixels B21, B22 are accumulated in capacitors 907, 908.

Thereafter, a control signal from the horizontal shift register 803 switches transfer switches 909, 910, 911, 912 to ON, which, at the horizontal output line 913, adds the signal components of the horizontal pixels B11 and B12 and furthermore, adds the signal components of the vertical pixels B21 and B22, thus completing 2×2 pixel summing.

Figure 10A:
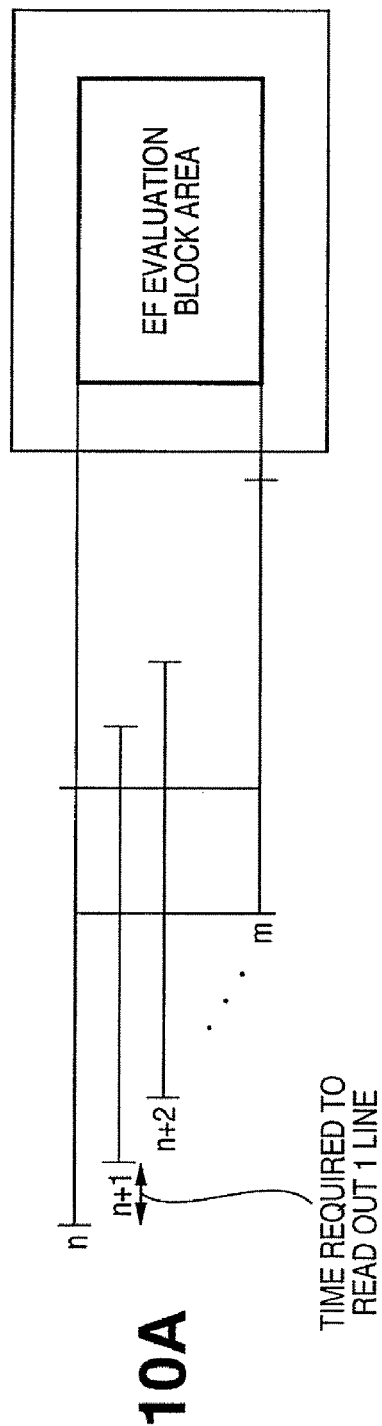
FIGS. 10A and 10B are diagrams illustrating a CMOS sensor read method and an EF operation.
Figure 10B:

A description is now given of a shift in timing when using an electronic rolling shutter for such as a CMOS sensor or the like, with reference to the CMOS read system shown in FIG. 10A and the illustration of the pre-flash (EF) shown in FIG. 10B. FIG. 10A shows the state of a photoelectric charge accumulation cycle of the pre-flash of an EF evaluation block area by, for example, a CMOS sensor. As the CMOS sensor attempts to accumulate the photoelectric charge, it reads out in units of one line, so that the start of accumulation of each line n, n+1, n+2, . . . , m shifts for all lines.

In addition, with respect to EF operation, light intensity in a case in which the flash/strobe is fired in a pre-flash for a certain time changes as shown in FIG. 10B, in which time is shown as the horizontal axis. The CMOS sensor picks up this change in the amount of light and evaluates a block area that is one part extracted from the entire area. At this time, accumulation of the electrical charge must be carried out for all lines n-m of the EF evaluation block area within a pre-flash period.

In other words, the flash cannot be correctly detected and accuracy thus declines if the entire EF evaluation block area is not illuminated by the light of the pre-flash. In the example shown in FIG. 10A and FIG. 10B, the entire EF evaluation block area is illuminated by the light from the pre-flash.

A description is now given of the types of cases in which a portion of the EF evaluation block area is not illuminated by the pre-flash, using examples.

(Normal Flash Photography (shutter speed 1/60 sec))

FIG. 11 shows the EF evaluation block area charging time cycle, in which the shutter speed is 1/60 sec and therefore the charging time is 16.7 ms. In addition, if hypothetically the time required to read out one line is 24 μs, and furthermore, if the number of lines in the vertical direction in the EVF is 180, then the read time per pixel is 24 μs×180=4.3 ms. As is clear from FIG. 11, the period in which the charging time for all the lines in the EF block area overlaps is 12.4 ms. If the pre-flash time is 20 μs, then by firing the pre-flash in this overlap period the pre-flash can be directed onto all the lines of the EF evaluation block area.

(Daylight Synchro Photography (Shutter Speed 1/250 sec))

FIG. 12 shows the EF evaluation block area charging time cycle, in which the shutter speed is 1/250 sec and therefore the charging time is 4 ms. In addition, the time required to read out one line and the number of lines in the vertical direction is the same as with normal photography. In this case, as is clear from FIG. 12, a period in which all the lines of the EF evaluation block area overlap in time does not exist, and therefore the pre-flash cannot be directed onto a portion of the lines of the EF evaluation block area no matter when the pre-flash is fired.

Thus, when shutter speed is high, as with daylight synchro photography and the like, the charging time is short compared to the time required to read out one line. As a result, among the lines of the EF evaluation block area there appear lines not exposed to the pre-flash.

From the foregoing results, only when the synchronized shutter speed, the read-out time from the EF evaluation block area and the pre-flash time satisfy equation (1) below can the pre-flash be directed onto the entire EF evaluation block area.

Synchronized shutter speed≧read-out time+pre-flash time     (1)

A pre-flash read-out mode can be accomplished by changing the parameter for shortening the read-out period for signals from a predetermined area of image sensing devices (in the present embodiment, 4×4 pixels) such as those below during pre-flash:

(1) number of pixels to be read in the horizontal direction
(2) driving frequency
(3) horizontal blanking period
(4) number of pixels to be read in the vertical direction By changing the values for (1), (2) and (3), the slant of the parallelogram shown in the timing chart can be changed. This situation is shown in FIG. 13. In addition, since the number of lines read changes if the value of (4) is changed, the timing changes as shown in FIG. 14. By changing at least one of these four values, a charging time (exposure period) of the line read first and the line read last can be made to overlap in time, wherein in time the charging time is determined by the shutter speed, and consequently a pre-flash read mode can be achieved in which the pre-flash is directed onto the entire EF evaluation block area.

Second Embodiment

In the first embodiment described above, at pre-flash there is always a shift to a pre-flash read mode. Then, in the pre-flash read mode, as previously noted, by setting (1) the number of pixels to be read in the horizontal direction, (2) the driving frequency, (3) the horizontal blanking period and (4) the number of pixels to be read in the vertical direction to appropriate values, the pre-flash is directed onto the entire EF evaluation block area.

However, there is a tendency to reduce the number of pixels to be read in the horizontal direction and the number of pixels to be read in the vertical direction tends to be reduced in order to accommodate high shutter speeds, and therefore there is a possibility that flash light adjustment accuracy might be degraded by excessive downsampling or thinning. In addition, because there is a tendency to increase the driving frequency, there appears to be a possibility that power consumption increases. In addition, because there is a tendency to decrease the horizontal blanking period, there appears to be a possibility that sensor performance deteriorates as switching speed is increased.

Figure 15:
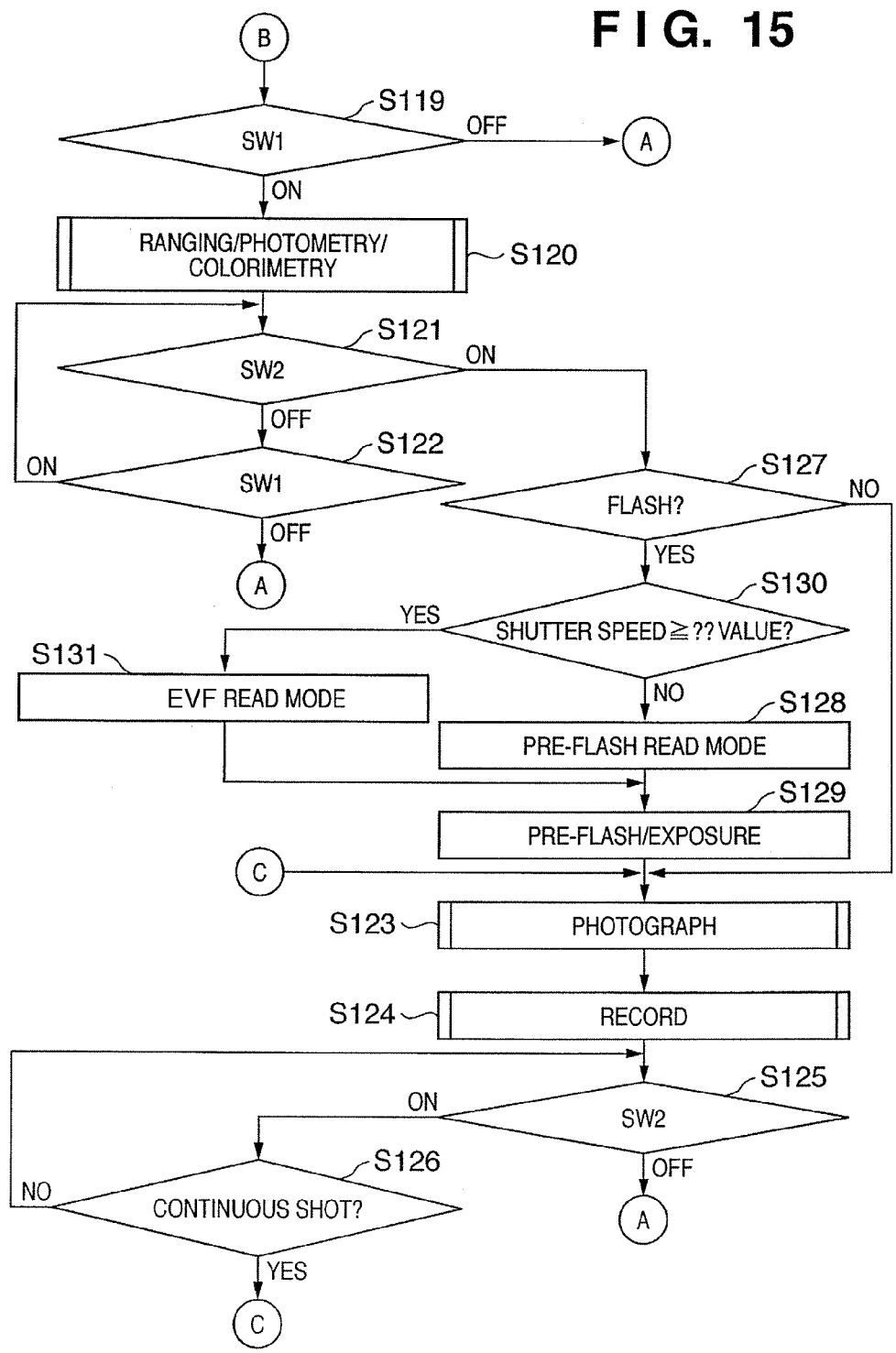
FIG. 15 is a flow chart illustrating a portion of the main routine of a processing operation at an image sensing apparatus according to a second embodiment of the present invention.

In the present embodiment, it is determined whether or not the pre-flash is directed onto the entire EF evaluation block area and a shift to the pre-flash read mode carried out only if the results of that determination are negative. FIG. 15 is a flow chart corresponding to FIG. 3 of the first embodiment of the present invention, with the same reference numerals assigned to similar processing operations as those shown in FIG. 3. Accordingly, a description is given here of only the differences between the two embodiments.

If the shutter switch SW2 is pressed (step S121), the system controller 50 determines whether or not the flash is required (step S127), and if required, first, determines whether or not the shutter speed exceeds a threshold value (step S130). The threshold value is equivalent to the "read time+pre-flash time" that appears in equation (1) described above. If the shutter speed does not exceed the threshold value, then the pre-flash is not directed onto the entire EF evaluation block area and therefore there is a switch to the pre-flash read mode (step S128). However, if the shutter speed does exceed the threshold value then the EVF read mode is retained as is (step S131) and the pre-flash/exposure process is performed (step S129).

Third Embodiment

In the first embodiment, in the pre-flash mode (1) the number of pixels to be read in the horizontal direction, (2) the driving frequency, (3) the horizontal blanking period and (4) the number of pixels to be read in the vertical direction are adjusted so that the pre-flash is directed onto the entire EF evaluation block area even at high shutter speeds.

However, because there is a tendency to adjust the driving frequency upwards, it appears there is a possibility that power consumption also increases.

In the present embodiment, the driving frequency is changed according to the shutter speed. In addition, the sensor is one that enables the selection of three types of driving frequencies, of 40 MHz, 20 MHz and 10 MHz.

In addition, assume that the digital camera synchronized shutter speed is 1/500 sec (2 ms), and furthermore, the pre-flash time is 1/2000 sec (0.5 ms), the read time at a driving frequency of 40 MHz is 1.5 ms. In this case, the synchronized shutter speed meets or exceeds (read time at 40 MHz driving frequency+pre-flash time), and the pre-flash is directed onto the entire EF evaluation block area.

Furthermore, assume that the read time is 20 ms at a driving frequency of 20 MHz, and the read speed is 2.5 ms at 10 MHz. In this case, the lowest shutter speed that satisfies equation (1) described above when the driving frequency is 20 MHz is read speed of 2 ms+pre-flash time of 0.5 ms=2.5 ms (1/400 sec). In other words, at a shutter speed of 2.5 ms or more, the driving frequency may be set at 20 MHz. Similarly, the lowest shutter speed that satisfies equation (1) described above when the driving frequency is 10 MHz is read time of 2.5 ms+pre-flash time of 0.5 ms=3.0 ms (1/333 sec). That is, at a shutter speed of 3.0 ms or more, the driving frequency may be set at 10 MHz.

In other words, the relation between shutter speed Tv and driving frequency may be summarized as follows:

(case 1) 2 ms≦2.5 ms driving frequency 40 MHz satisfies equation (1) described above (case 2) 2.5 ms≦3 ms driving frequency 20 MHz satisfies equation (1) described above (case 3) 3 ms≦Tv driving frequency 10 MHz satisfies equation (1) described above.

Figure 16:
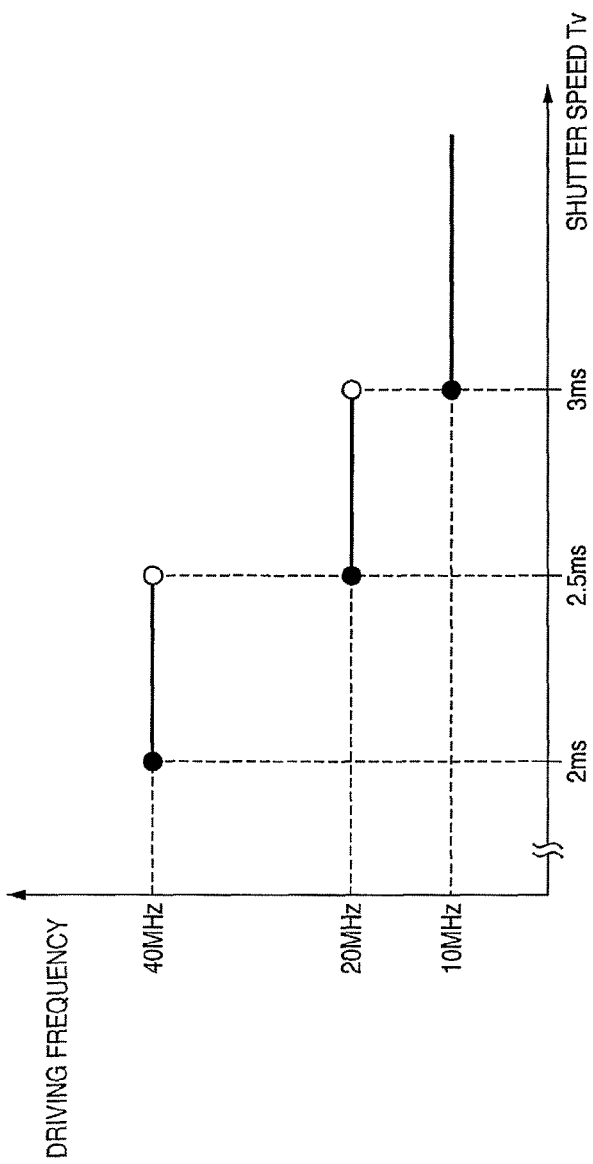
FIG. 16 is a diagram illustrating the relation between shutter speed and driving frequency in an image sensing apparatus according to a third embodiment of the present invention.

This relation is summarized in FIG. 16, and allows the driving frequency to be slowed according to the shutter speed without the need to drive the apparatus at a driving frequency of 40 MHz at all times. As a result, electrical power consumption can be reduced.

Fourth Embodiment

The fourth embodiment differs from the first to third embodiments with regard to the sequence shown in FIG. 7, but is the same as the first to third embodiments with respect to the remaining parts.

Figure 17:
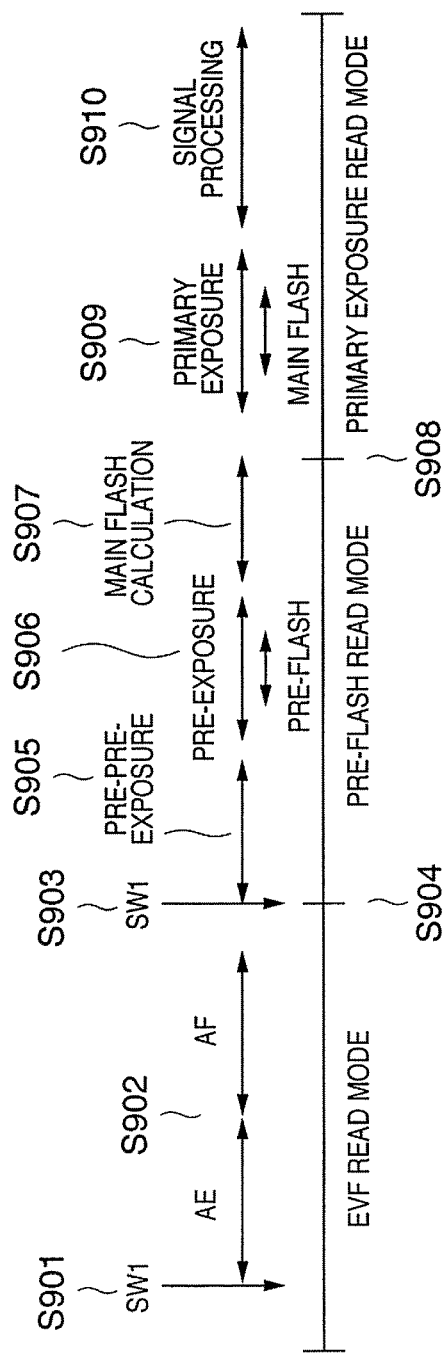

FIG. 17 is a diagram showing the sequence of a processing operation when the flash is on. In the EVF read mode, when the switch SW1 is switched ON by pressing a shutter button, not shown, halfway (step S901), the AE process and AF process are executed (step S902), and the exposure and focus are adjusted. Thereafter, when the switch SW2 is switched ON by pressing the shutter button, not shown, completely down (step S903), the read mode shifts to pre-exposure read mode (step S904).

In this pre-exposure read mode, exposure is performed in a state in which pre-exposure is prevented (hereunder, referred to as "pre-pre-exposure") (step S905), and next exposure is performed in a state in which pre-exposure is carried out (hereunder, referred to as "pre-exposure") (step S906). Thereafter, the main flash calculation is performed using the output by pre-pre-exposure and the output by pre-exposure (step S907).

Next, the processing operation shifts to primary exposure read mode (step S908) in which primary exposure is performed using the main flash amount that was determined in step S907 (step S909), signal processing is performed (step S910), and image data is recorded on the recording medium. Switching to a pre-exposure read mode immediately after the switch SW2 is turned ON, reading the output from an exposure performed without illuminating using a pre-flash, thereafter reading the output from an exposure performed while illuminating using a pre-flash, and then determining the main flash amount of the flash using these two image data is one feature of the present invention.

In this connection, although the order above is one in which output from an exposure performed while illuminating using a pre-flash is read after reading the output from an exposure performed without the pre-flash, the order may be the opposite thereto. The reason for adopting the order of the present embodiment is to shorten the interval between the pre-flash and main flash. More specifically, this is to prevent the subject from mistaking the pre-flash for the main flash and misunderstanding that the picture taking has been completed.

Further, an image captured at the pre-pre-exposure and the pre-exposure is not displayed on the EVF. As described later, this is because the exposure is not correct.

<Calculation of Flash Light Emission Amount>

Figure 18:
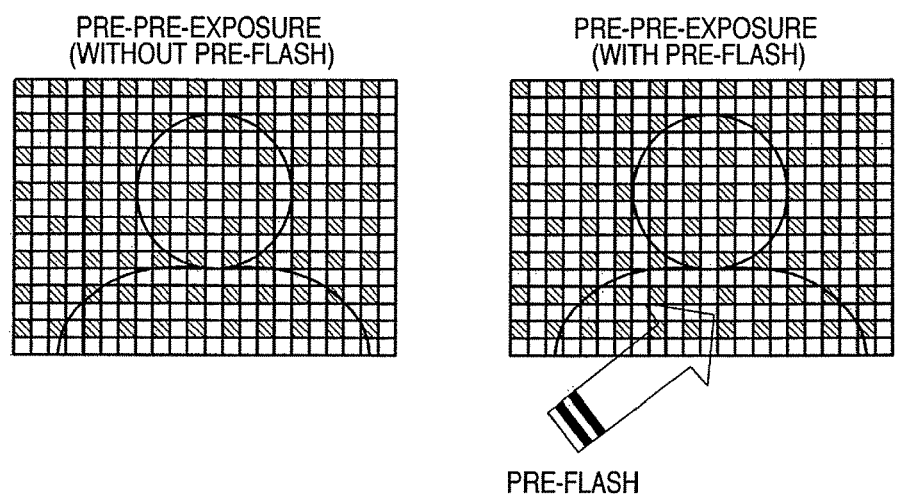
FIG. 18 is a conceptual diagram for describing read at pre-pre-exposure and at pre-exposure.

Next, calculation of the flash light emission amount using output from the pre-pre-exposure and output from the pre-exposure will be described. Since the calculation uses a differential value between the pre-pre-exposure and the pre-exposure, as well as making the exposure conditions for the pre-pre-exposure and the pre-exposure the same, it is necessary to make the summing and thinning equal by driving and reading for both types of exposure in the same mode and to also match the sensitivity conditions. FIG. 18 shows a conceptual diagram is which the reading method is common for both types of exposure at a horizontal and vertical value of ½.

Step S1: Calculation of Subject Weighting

The subject weighting is calculated using the pre-pre-exposure image and pre-exposure image shown in FIG. 19. In this connection, the exposure conditions are the same for both images. These images are divided into blocks of 6×6. However, the number of block divisions is not limited to 6. At this time, the pre-flash intensity FLASHij is obtained by the following equation (2).

$$FLASHij = Yfij - Ydij \quad (2)$$

Where, Yfij is a pre-exposure photometric value, that is, a brightness value obtained by adding external light and the light of pre-flash, and Ydij is a pre-pre-exposure photometric value, that is, the brightness value obtained from the external light.

In this connection, the brightness value is calculated according to the following equation (3). In equation (3), WbR, WbG, and WbB are the white balance coefficients for red, green, and blue, respectively, and R, G, and B are block integration mean values of red, green, and blue, respectively.

$$Y = 3WbR \times R + 6 \times WbG \times G + WbB \times B \quad (3)$$

Furthermore, since there is a high probability that the subject will be in the center of the image, as in the following equation (4), the subject weighting W1ij is calculated by multiplying a center weighting Wij as shown in FIG. 20 by the pre-flash intensity FLASHij.

$$W1ij = FLASHij \times Wij \quad (4)$$

Step 2: Determination of Flash Light Emission Amount

Figure 21:
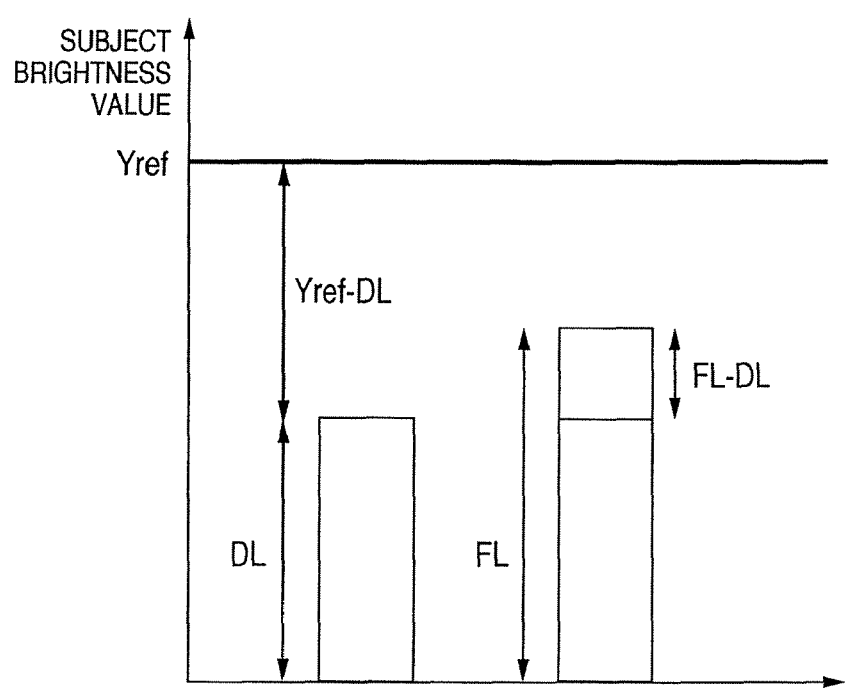
FIG. 21 is a view for describing a concept for determining the flash light emission amount.

FIG. 21 shows subject brightness values for pre-pre-exposure and pre-exposure (DL and FL). DL and FL are calculated by the following equation (5) using the subject weighting Wij obtained in step 1.

$$DL = \frac{\sum Ydij \times Wij}{\sum Wij} \quad (5)$$

$$FL = \frac{\sum Yfij \times Wij}{\sum Wij}$$

At this time, based on FIG. 21, the brightness value produced by the pre-flash is FL-DL. Further, when Yref is taken as a predetermined appropriate brightness value of the subject, the main flash amount is Yref-DL. Accordingly, it is possible to calculate by what flash amount multiple to illuminate by with respect to the pre-flash amount (referred to as ΔEF) using the following equation (6).

$$\Delta EF = \frac{Yref - DL}{FL - DL} \quad (6)$$

The value ΔEF that is calculated in equation (6), i.e. the value showing by what multiple of the pre-flash amount to illuminate by, relates to a time of pre-pre-exposure and a time of pre-exposure, and is inapplicable when performing exposure at the principal exposure. Accordingly, the value obtained by equation (6) must be converted to a value at the principal exposure. The conversion is performed using the following equation (7).

$$\Delta EF_{cap} = \frac{Yref - DL \times 2^{(\Delta Sv + \Delta Av + \Delta Tv)}}{(FL - DL) \times 2^{(\Delta Sv + \Delta Av)}} \quad (7)$$

Where, ΔSv, ΔAv, and ΔTv denote an ISO sensitivity differential value, an F-value differential value, and a shutter speed differential value, respectively, which are obtained by the following equation (8). In this connection, the settings at the time of the pre-flash are, F value: Avp, shutter speed: Tvp, and ISO sensitivity: Svp; and the settings at the time of the main flash are, F value: Avc, shutter speed: Tvc, and ISO sensitivity: Svc.

$$\Delta Sv = Svp - Svc, \Delta Av = Avp - Avc, \Delta Tv = Tvp - Tvc \quad (8)$$

As described above, even at the time of a high-speed shutter operation, it is possible to illuminate the entire EF evaluation block area by the light of the pre-flash by employing the pre-exposure read mode. Further, by carrying out pre-pre-exposure and pre-exposure in the same driving mode, and calculating the main flash amount on the basis of the differential value between these image data, the accuracy of the strobe light adjustment can be enhanced.

Fifth Embodiment

According to the above-described fourth embodiment, a setting was made so that a temporal overlap is produced at each line in pre-exposure read mode by thinning out the number of vertical pixels for reading. However, since the number of pixels to be thinned out of a normal vertical line is around ¹⁄₁₂, although it depends on the overall number of pixels of the sensor, when the output of the full angle of view is kept in the memory and the above processing is performed for the electronic zoom area, there is a risk that the accuracy of the flash light emission amount calculation will decrease due to the further reduction in the number of lines.

Therefore, at a time of an electronic zoom operation, partial read that is a characteristic of a CMOS-type sensor is applied to the pre-exposure read mode. More specifically, at a time of an electronic zoom operation, by reading only the electronic zoom area in pre-exposure read mode the reading speed is increased and a temporal overlap is produced in all the lines.

Further, by reducing the number of pixels to be thinned out in accordance with an increase in the zoom magnification, the number of lines used for EF light adjustment integration is increased and the accuracy of a flash light emission amount calculation is improved.

Since the sequence of the flash photometry and the flash photometry calculation method are the same as described in the first embodiment, a description thereof is omitted here.

<Partial Read Operation>

FIG. 22 shows the configuration of an image sensing device 14 comprising 9×9 pixels. An operation that outputs signals from an area of one portion of the image sensing device 14 will now be described. In order to specify each nine pixels in the X direction and Y direction, respectively, a horizontal decoder 823 and a vertical decoder 824 are provided. Further, a block 852 is defined by 3×3 pixel units, as exemplified by a pixel unit 815. In this connection, the above described vertical shift register 801 and the vertical decoder 824 correspond to the Y address selecting unit 5 shown in FIG. 1, and horizontal shift register 803 and the horizontal decoder 823 correspond to the X address selecting unit 6 shown in FIG. 1.

In this case, HD 0 to HD 1 are input into the horizontal decoder 823, and a clock pulse (CLK) and a horizontal reset pulse (HRES) are input into the horizontal shift register 803. The configuration is the same in the vertical direction, in which VD 0 to VD 1 are input into the vertical decoder 824, and the clock pulse (CLK) and a vertical reset pulse (VRES) are input into the vertical shift register 801. Since the horizontal unit and the vertical unit are substantially equivalent, only the horizontal direction will be discussed hereunder.

First, since there are two inputs, HD 0 to HD 1, to the horizontal decoder 823 (2-bit), although it is not possible to specify all horizontal nine pixels with this input, it is possible to directly specify up to three pixels. Therefore, in FIG. 22 a configuration is adopted in which the horizontal nine pixels are divided into three blocks of three pixels each, and the three pixels that are the first pixels of the block can be specified by the horizontal decoder 823.

The horizontal shift register 803 is disposed between the horizontal decoder 823 and the image sensing device 14. It is configured to receive the leading position of each block 852 to be obtained from the horizontal decoder 823, and to scan the image sensing device 14, one pixel at a time, from that position using the clock pulse CLK. This position is referred to as the read leading position (start position). When the scanning is stopped, the contents of the horizontal shift register 803 are erased by the horizontal reset pulse HRES.

Although the horizontal unit was described in this case, the operation is the same for the vertical decoder 824 and the vertical shift register 801. More specifically, when selecting a selected block by its alignment in a horizontal line, the same effect can be obtained by a similar operation by decoding in the same manner as described above and selecting the pixel read area with the vertical shift register 801.

Furthermore, although it was described that the input of the horizontal decoder 823 is 2-bit input consisting of HD 0 to HD 1, it is also possible to set the address specification in greater detail by increasing the number of inputs.

<Read Operation at Time of Electronic Zoom>

Next, a description will be given regarding read processing of signals at the time of an electronic zoom operation. First, a description will be given regarding a read operation at the time of normal imaging and a read operation at the time of an electronic zoom operation with reference to FIG. 23A and FIG. 23B.

Figure 23A:
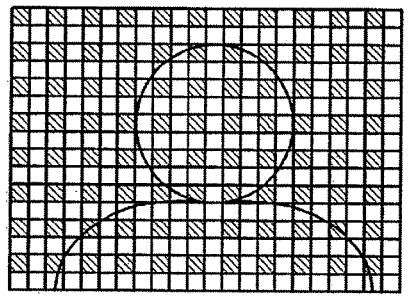
FIGS. 23A and 23B are diagrams for illustrating the concepts of electronic zoom magnification and the number of pixels to be thinned out.
Figure 23B:
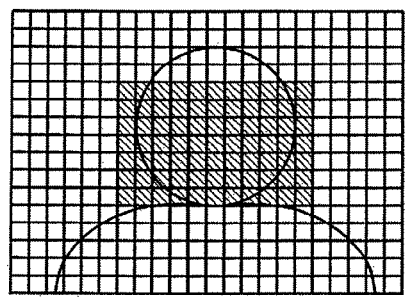
Figure 24A:
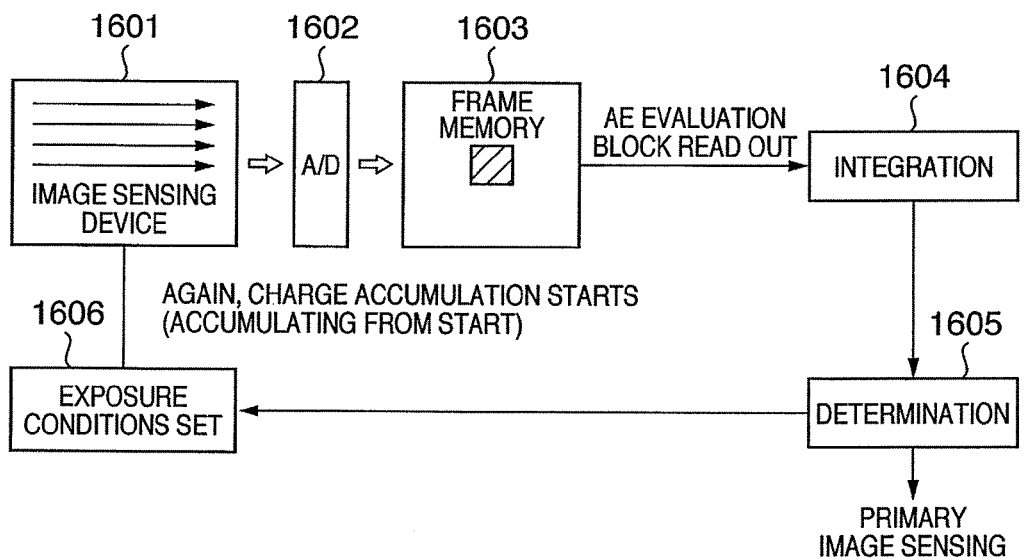
FIGS. 24A, 24B and 24C are diagrams illustrating an AE method according to an image sensing unit using a CCD.
Figure 24B:
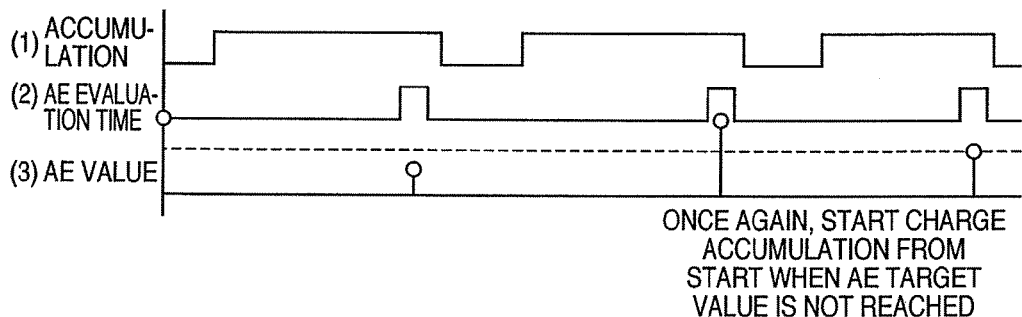
Figure 24C:
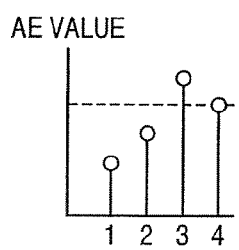

FIGS. 23A and 23B are conceptual diagrams that illustrate an electronic zoom operation. FIG. 23A illustrates reading of the full angle of view, and FIG. 23B illustrates reading at the time of an electronic zoom operation. When reading the full angle of view, by utilizing the summing control that was described in the first embodiment, reading is performed by reducing the number of pixels by, for example, outputting a signal obtained by summing four pixels of the image sensing device 4. Conceptually speaking, a read operation is performed in which the signals of the pixels indicated by the diagonal lines in FIG. 23A, that is, the signals of 12×8 pixels from the range of 24×16 pixels in the vertical and horizontal directions are read.

In contrast, at the time of an electronic zoom operation (for example, in the case of a zoom magnitude of twofold), by utilizing non-summing control the signals of the continuous 12×8 pixels in the center of the range of 24×16 pixels are read. More specifically, a predetermined area is extracted and the signals of that area are read, resulting in an operation to read the signals of the pixels indicated by the diagonal lines in FIG. 23B.

By these operations, the number of integrated pixels used for EF light adjustment when reading the full angle of view is 12×8 pixels. Further, the number of integrated pixels used for EF light adjustment when performing an electronic zoom operation (for example, in the case of a zoom magnitude of twofold) is also 12×8 pixels, which is the same as when reading the full angle of view. Thus, since the number of pixels used in calculating the EF light adjustment is fixed irrespective of the electronic zoom magnification, the calculation accuracy can be made independent of the electronic zoom magnification.

Although according to the present embodiment the summing when reading the full angle of view was ½ and horizontal and vertical thinning out was not performed when performing an electronic zoom operation, the summing or the number of pixels to be thinned out at the time of an electronic zoom operation may be made less than for the full angle of view. Naturally, the summing or the number of pixels to be thinned out may be further reduced to improve the accuracy of light adjustment at the time of an electronic zoom operation to a level that is equal to or greater than the accuracy of EF light adjustment when reading the full angle of view.

Further, although a case was described according to the present embodiment in which the electronic zoom magnification is twofold, naturally the summing or the number of pixels to be thinned out is decreased as the magnification increases in the case of other electronic zoom magnifications also.

As described above, it is possible to improve the accuracy of a flash light emission amount calculation when performing an electronic zoom operation by reading only the zoom area, and decreasing the summing or the number of pixels to be thinned out in accordance with the electronic zoom magnification.

Other Embodiments

It should be noted that the invention also includes a case in which the same functions as those of the present invention are achieved by supplying a software program that implements the functions of the embodiments described above to a system or apparatus having a computer (or a CPU or MPU) capable of executing the program, with the computer of the system or apparatus then executing the program thus supplied.

In this case, the program code read out from the storage medium itself implements the functions of the embodiment described above, and the program code itself and the storage medium storing the program code comprise the present invention.

Examples of storage media that can be used for supplying the program code include a floppy disk, hard disk, optical disk, magneto-optical disk, CD-ROM, CD-R, magnetic tape, non-volatile memory card, ROM or the like.

Besides those cases in which the functions according to the embodiments described above are implemented by a computer executing the read program, an OS (basic system or operating system) or the like running on the computer may perform all or a part of the actual processing based on the instructions of that program, so that the functions of the foregoing embodiments can be implemented by this processing.

Furthermore, after the program read from the storage medium is written to a function expansion board inserted in the computer or to a memory provided in a function expansion unit connected to the computer, a CPU or the like mounted on the function expansion board or function expansion unit may perform all or a part of the actual processing, so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2004-381271 filed on Dec. 28, 2004, Japanese Patent Application No. 2005-241659 filed on Aug. 23, 2005, and Japanese Patent Application No. 2006-058382 filed on Mar. 3, 2006, which are hereby incorporated by reference herein in their entirety.

What is claimed is:

1. An image sensing apparatus comprising:
 a flash unit adapted to emit flashlight to a subject;
 an image sensing unit in which pixels containing photoelectric conversion devices are arranged in a plurality of lines;
 a drive unit configured to drive said image sensing unit so as to shift an exposure period in units of one line or a plurality of lines; and
 a control unit configured to determine, when a pre-flash firing for determining flash amount of the flash unit based on a signal output from a predetermined area of the image sensing unit is to be performed, if a shutter speed is less than a predetermined threshold value and:
  (a) if it is determined that the shutter speed is less than the threshold value, switch a read mode of the image sensing unit from a through-display read mode to a pre-flash read mode, and cause the flash unit to perform the pre-flash firing; and
  (b) if it is determined that the shutter speed is not less than the threshold value, cause the flash unit to perform the pre-flash firing without switching a read mode of the image sensing unit from the through-display read mode to the pre-flash read mode,
 wherein the through-display read mode is a read mode for performing through-display that displays continuous images output sequentially from the image sensing unit on a display unit, and the pre-flash read mode is a read mode in which a read period of the signal output from the predetermined area of the image sensing unit is shorter than that of the through-display read mode, and
 wherein the threshold value is equal to a sum of a read time from the predetermined area of the image sensing unit and a pre-flash time.

2. The image sensing apparatus according to claim 1, wherein in the pre-flash read mode, at least one of (1) the number of pixels to be read in the horizontal direction, (2) a driving frequency, (3) a horizontal blanking period, and (4) the number of pixels to be read in the vertical direction is changed from those in the through-display read mode.

3. The image sensing apparatus according to claim 1, wherein during the pre-flash read mode, the through-display is not performed.

4. A control method of controlling an image sensing apparatus comprising a flash unit adapted to emit flashlight to a subject, an image sensing unit in which pixels containing photoelectric conversion devices are arranged in a plurality of lines, and a drive unit configured to drive said image sensing unit so as to shift an exposure period in units of one line or a plurality of lines, the method comprising the steps of:
 determining, when a pre-flash firing for determining flash amount of the flash unit based on a signal output from a predetermined area of the image sensing unit is to be performed, if a shutter speed is less than a predetermined threshold value;
 if it is determined that the shutter speed is less than the predetermined threshold value, switching a read mode of the image sensing unit from a through-display read mode to a pre-flash read mode, and cause the flash unit to perform the pre-flash firing; and
 if it is determined that the shutter speed is not less than the predetermined threshold value, causing the flash unit to perform the pre-flash firing without switching a read mode of the image sensing unit from the through-display read mode to the pre-flash read mode,
 wherein the through-display read mode is a read mode for performing through-display that displays continuous images output sequentially from the image sensing unit on a display unit, and the pre-flash read mode is a read mode in which a read period of the signal output from the predetermined area of the image sensing unit is shorter than that of the through-display read mode, and
 wherein the predetermined threshold value is equal to a sum of a read time from the predetermined area of the image sensing unit and a pre-flash time.

5. The method of claim 4, wherein in the pre-flash read mode, at least one of (1) the number of pixels to be read in the horizontal direction, (2) a driving frequency, (3) a horizontal blanking period, and (4) the number of pixels to be read in the vertical direction is changed from those in the through-display read mode.

6. The method of claim 4, wherein during the pre-flash read mode, the through-display is not performed.

* * * * *